(12) United States Patent
Tshilombo et al.

(10) Patent No.: US 9,911,306 B2
(45) Date of Patent: Mar. 6, 2018

(54) HYDRATION CONTAINER WITH LIQUID VOLUME MEASUREMENT

(71) Applicant: MAGICAL BY DESIGN, LLC, Seattle, WA (US)

(72) Inventors: Bukasa Tshilombo, Snohomish, WA (US); Kandarp Jani, Bellevue, WA (US); David Winkler, Seattle, WA (US)

(73) Assignee: MAGICAL BY DESIGN, LLC, Seattle, WA (US)

(*) Notice: Subject to any disclaimer, the term of this patent is extended or adjusted under 35 U.S.C. 154(b) by 0 days.

(21) Appl. No.: 15/455,896

(22) Filed: Mar. 10, 2017

(65) Prior Publication Data

US 2017/0263102 A1    Sep. 14, 2017

Related U.S. Application Data

(60) Provisional application No. 62/306,846, filed on Mar. 11, 2016.

(51) Int. Cl.
   *G08B 21/00* (2006.01)
   *G08B 21/18* (2006.01)
   (Continued)

(52) U.S. Cl.
   CPC ......... *G08B 21/182* (2013.01); *A47G 23/16* (2013.01); *G01F 22/00* (2013.01)

(58) Field of Classification Search
   CPC .................................................. G08B 21/182
   (Continued)

(56) References Cited

U.S. PATENT DOCUMENTS

| 5,001,596 A | 3/1991 | Hart |
| 5,726,908 A * | 3/1998 | Hosmer ............... F17C 13/008 |
| | | 361/284 |

(Continued)

FOREIGN PATENT DOCUMENTS

WO    2012/102701 A1    8/2012

OTHER PUBLICATIONS

International Search Report and Written Opinion of the International Searching Authority, dated Jun. 28, 2017, for International Application No. PCT/US2017/021906, 27 pages.

*Primary Examiner* — Santiago Garcia
(74) *Attorney, Agent, or Firm* — Seed IP Law Group LLP

(57) ABSTRACT

Systems and methods for providing a smart hydration container or bottle which accurately tracks a user's liquid intake. The smart hydration container utilizes a new capacitive sensing technology which does not require a complicated design for capacitive conductive surfaces and provides accurate capacitive measurements which map to volume measurements. Through the use of calibrated data, the smart hydration container accurately measures capacitance "as a whole" of the entire container's contents even when the container is not resting upright. In some implementations, the smart hydration container utilizes a combination of capacitive sensing, motion sensing, position sensing, and/or temperature sensing to provide an accurate measure of liquid volume in the container. The capacitive sensor may be electrically shielded by a passive conductive sensor shield, a grounded conductive sensor shield, or an active conductive sensor shield.

30 Claims, 17 Drawing Sheets

(51) Int. Cl.
*A47G 23/16* (2006.01)
*G01F 22/00* (2006.01)

(58) Field of Classification Search
USPC .......................................................... 340/612
See application file for complete search history.

(56) References Cited

U.S. PATENT DOCUMENTS

| | | | | |
|---|---|---|---|---|
| 5,830,360 | A | * | 11/1998 | Mozayeni ............... C02F 1/003 210/266 |
| 7,258,005 | B2 | | 8/2007 | Nyce |
| 2004/0187570 | A1 | | 9/2004 | Williamson |
| 2008/0115814 | A1 | * | 5/2008 | Hasegawa ............... A61B 1/123 134/56 R |
| 2009/0262161 | A1 | * | 10/2009 | Nishihara ............ B41J 2/17546 347/19 |
| 2012/0097567 | A1 | * | 4/2012 | Zhao ...................... A47G 23/16 206/459.1 |
| 2016/0025545 | A1 | | 1/2016 | Saltzgiver et al. |
| 2016/0242598 | A1 | * | 8/2016 | Alexander .......... A47J 36/2433 |
| 2016/0286993 | A1 | * | 10/2016 | Pau ........................ A47G 23/16 |
| 2017/0153139 | A1 | * | 6/2017 | Huang .................. G01F 23/266 |
| 2017/0183617 | A1 | * | 6/2017 | Jones ..................... C12M 27/02 |
| 2017/0188731 | A1 | * | 7/2017 | Schuller ................. A47G 23/16 |
| 2017/0245678 | A1 | * | 8/2017 | Wakeham ............... A47G 23/04 |
| 2017/0246399 | A1 | * | 8/2017 | Forlani ............. A61M 5/31568 |

\* cited by examiner

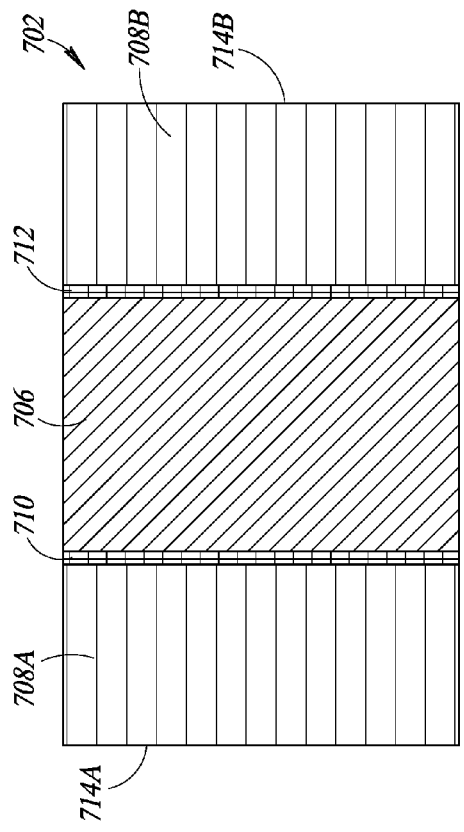
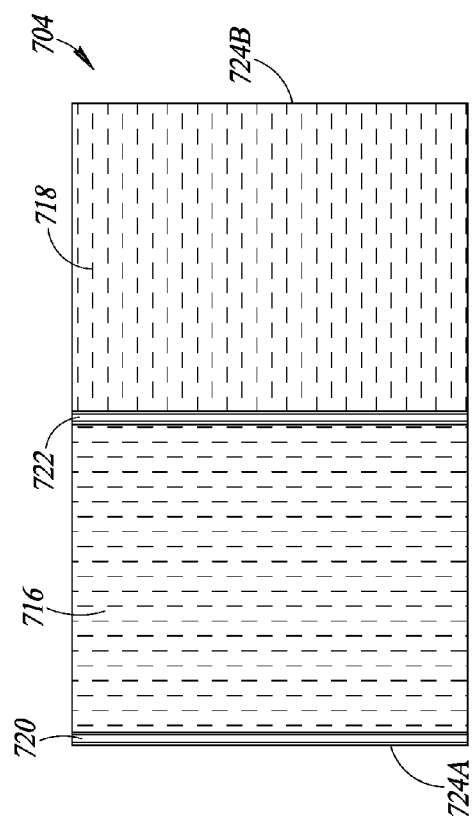
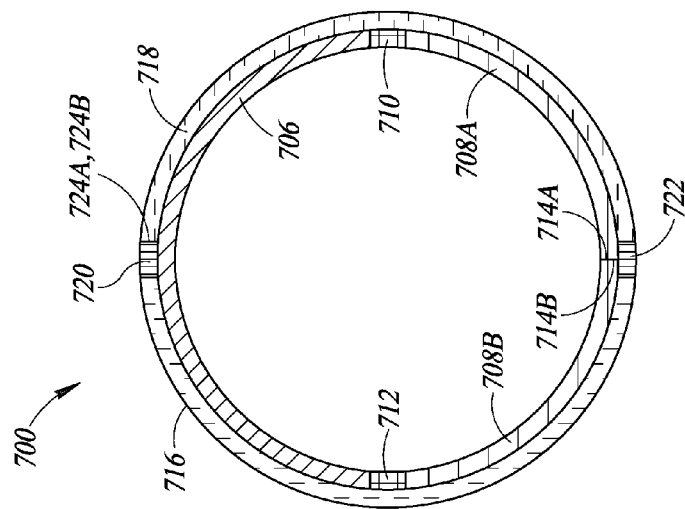
FIG.7B
FIG.7C
FIG.7A

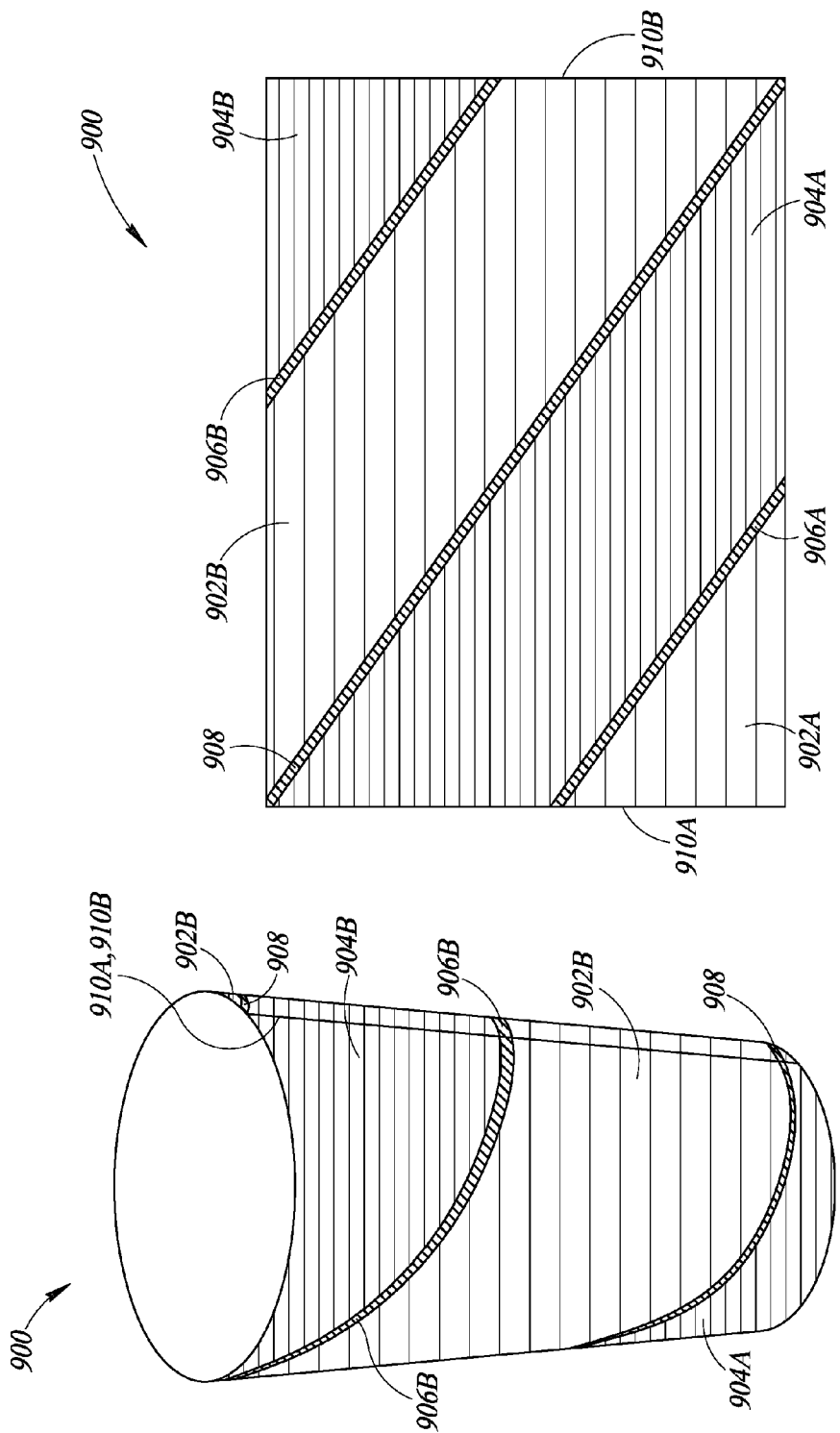

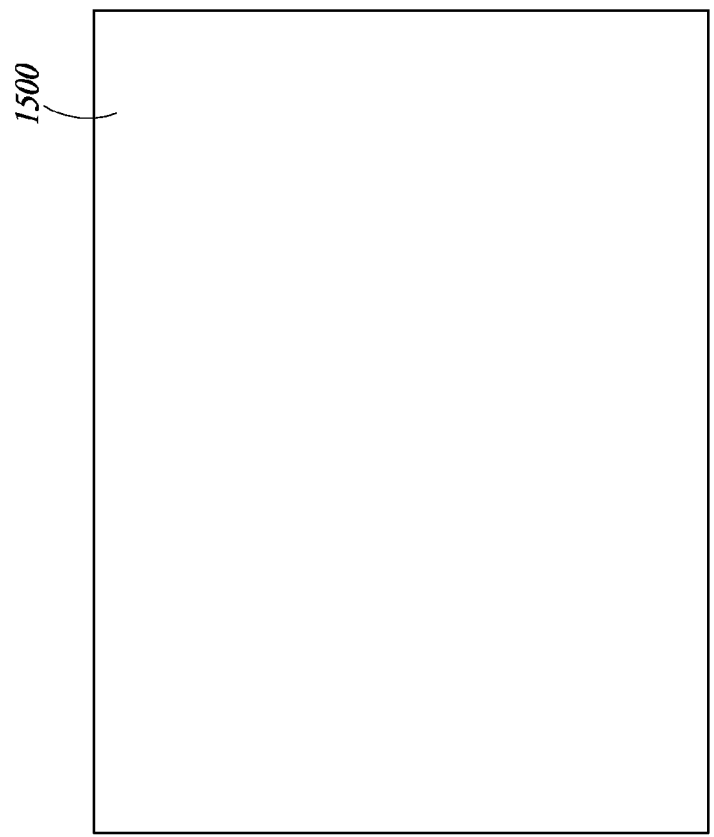
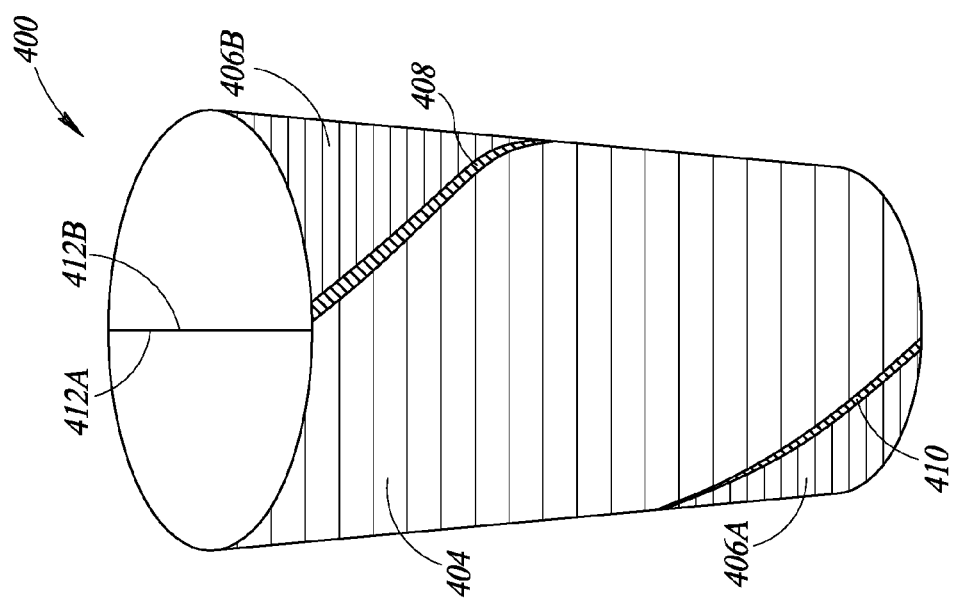
FIG.15

HYDRATION CONTAINER WITH LIQUID VOLUME MEASUREMENT

BACKGROUND

Technical Field

The present disclosure generally relates to systems and methods for measuring liquid volume in containers.

Description of the Related Art

There are many issues with poor hydration, which affects roughly half of all adults in the United States. Stated differently, for a large percentage of the population, the craving of thirst is not sufficient to maintain proper hydration. Good hydration is a leading health indicator, yet hydration is often not well tracked because at present tracking hydration is a manual process where the person needs to remember the amount of liquid consumed throughout a day, week, etc.

Accordingly, there is a need for a hydration solution which accurately and conveniently tracks hydration for users over a period of time.

BRIEF SUMMARY

A container may be summarized as including a container body which defines a volume for receiving a liquid; a capacitive sensor comprising: a first conductive surface helically wrapped at least one full turn around the container body; and a second conductive surface helically wrapped at least one full turn around the container body, the second conductive surface adjacent the first conductive surface and separated therefrom by a first helically shaped gap and a second helically shaped gap; at least one nontransitory processor-readable storage medium which stores at least one of processor-executable instructions or data; and at least one processor communicatively coupled to the at least one nontransitory processor-readable storage medium and the capacitive sensor, in operation the at least one processor: receives a capacitive sensor signal output from the capacitive sensor, the capacitive sensor signal indicative of a capacitance value between the first and second conductive surfaces; autonomously determines a volume of liquid present in the container body based at least in part on the received capacitive sensor signal; and stores the determined volume of liquid in the at least one nontransitory processor-readable storage medium.

The first conductive surface and the second conductive surface may include at least one of aluminum, copper, conductive paint, indium tin oxide coated plastic, or conductive filament. The first conductive surface and the second conductive surface may each be helically wrapped at least two turns around the container body. The first conductive surface may have a first surface area and the second conductive surface may have a second surface area, the second surface area substantially equal to the first surface area. The first conductive surface may have a first surface area and the second conductive surface may have a second surface area, the second surface area different from the first surface area. The first conductive surface may have a first surface area, the second conductive surface may have a second surface area, and the container body may have a third surface area, the first and second surface areas together may include at least fifty percent of the third surface area. The first conductive surface may have a first surface area, the second conductive surface may have a second surface area, and the container body may have a third surface area, the first and second surface areas together may include at least ninety percent of the third surface area. The first helically shaped gap may be disposed at a first helical angle and the second helically shaped gap may be disposed at a second helical angle, the second helical angle different from the first helical angle. The first conductive surface may have a first width and the second conductive surface may have a second width, the second width substantially equal to the first width. The first conductive surface may have a first conductive surface width, the second conductive surface may have a second conductive surface width, the first helically shaped gap may have a first gap width, the second helically shaped gap may have a second gap width, and each of the first and second gap widths may be less than either of the first and second conductive surface widths. The at least one processor may implement at least one of a lookup table, a regression curve fit, or an artificial neural network model to autonomously determine a volume of liquid present in the container body based at least in part on the received capacitive sensor signal.

The container may further include a temperature sensor which in operation outputs a temperature sensor signal indicative of a temperature of the liquid in the container body, wherein the at least one processor is communicatively coupled to the temperature sensor, and in operation the at least one processor: receives the temperature sensor signal from the temperature sensor; autonomously determines a volume of liquid present in the container body based at least in part on the received capacitive sensor signal and temperature sensor signal; and stores the determined volume of liquid in the at least one nontransitory processor-readable storage medium. The at least one processor may implement at least one of a lookup table, a regression curve fit, or an artificial neural network model to autonomously determine a volume of liquid present in the container body based at least in part on the received capacitive sensor signal and temperature sensor signal.

The container may further include at least one user notification indicator which in operation generates a user-perceptible signal, wherein the at least one processor is communicatively coupled to the at least one user notification indicator, and in operation the at least one processor: autonomously causes the at least one user notification indicator to generate the user-perceptible signal based at least in part on the determined volume of liquid stored in the at least one nontransitory processor-readable storage medium. The at least one user notification indicator may include at least one of a light, a speaker, a buzzer, or a vibrator. The at least one user notification indicator may include at least one user notification indicator of a separate computing device communicatively coupled with the at least one processor of the container. The at least one processor may receive a trigger signal; and autonomously determine a volume of liquid present in the container body responsive to the received trigger signal. The trigger signal may be generated based at least in part on an elapsed amount of time. The trigger signal may be generated based at least in part on a detection of a movement of the container body. The trigger signal may be generated based at least in part on a detection of at least one of: the container being picked up by a user or the container being shaken by a user.

The container may further include a conductive sensor shield which surrounds at least a portion of the capacitive sensor and is electrically isolated from the capacitive sensor. The conductive sensor shield may be formed from one of a metal plate, a sheet of metal foil, or a conductive coating. The conductive sensor shield may be electrically coupled to the capacitive sensor signal output of the capacitive sensor.

The conductive sensor shield may be electrically coupled to one of a ground voltage potential or a voltage potential to which the capacitive sensor is charged.

A container may be summarized as including a container body which defines a volume for receiving a liquid; a capacitive sensor; a temperature sensor; at least one nontransitory processor-readable storage medium which stores at least one of processor-executable instructions or data; and at least one processor communicatively coupled to the at least one nontransitory processor-readable storage medium, the capacitive sensor, and the temperature sensor, in operation the at least one processor: receives a capacitive sensor signal output from the capacitive sensor, the capacitive sensor signal indicative of a capacitance value of the capacitive sensor which varies based at least in part with the volume of liquid present in the container body; receives a temperature sensor signal from the temperature sensor, the temperature sensor signal indicative of a temperature of the liquid in the container body; autonomously determines a volume of liquid present in the container body based at least in part on the received capacitive sensor signal and temperature sensor signal; and stores the determined volume of liquid in the at least one nontransitory processor-readable storage medium. The capacitive sensor may include at least one conductive surface formed from at least one of aluminum, copper, conductive paint, indium tin oxide coated plastic, or conductive filament. The at least one processor may implement at least one of a lookup table, a regression curve fit, or an artificial neural network model to autonomously determine a volume of liquid present in the container body based at least in part on the received capacitive sensor signal and temperature sensor signal.

The container may further include at least one user notification indicator which in operation generates a user-perceptible signal, wherein the at least one processor is communicatively coupled to the at least one user notification indicator, and in operation the at least one processor: autonomously causes the at least one user notification indicator to generate the user-perceptible signal based at least in part on the determined volume of liquid stored in the at least one nontransitory processor-readable storage medium. The at least one user notification indicator may include at least one of a light, a speaker, a buzzer, or a vibrator. The at least one user notification indicator may include at least one user notification indicator of a separate computing device communicatively coupled with the at least one processor of the container. The capacitive sensor may include a first set of conductive surfaces wrapped around at least a portion of the container body; and a second set of conductive surfaces wrapped around at least a portion of the container body, the second set of conductive surfaces disposed radially outward of the first set of conductive surfaces.

A container may be summarized as including a container body which defines a volume for receiving a liquid; a capacitive sensor; an orientation sensor which in operation outputs an orientation sensor signal indicative of an orientation of the container body; at least one nontransitory processor-readable storage medium which stores at least one of processor-executable instructions or data; and at least one processor communicatively coupled to the at least one nontransitory processor-readable storage medium, the capacitive sensor, and the orientation sensor, in operation the at least one processor: receives a capacitive sensor signal output from the capacitive sensor, the capacitive sensor signal indicative of a capacitance value of the capacitive sensor; receives the orientation sensor signal from the orientation sensor; autonomously determines a volume of liquid present in the container body based at least in part on the received capacitive sensor signal and orientation sensor signal; and stores the determined volume of liquid in the at least one nontransitory processor-readable storage medium.

The container may further include a temperature sensor which in operation outputs a temperature sensor signal indicative of a temperature of the liquid in the container body; wherein the at least one processor is communicatively coupled to the temperature sensor, and in operation the at least one processor: receives the temperature sensor signal from the temperature sensor; autonomously determines a volume of liquid present in the container body based at least in part on the received capacitive sensor signal, temperature sensor signal, and orientation sensor signal; and stores the determined volume of liquid in the at least one nontransitory processor-readable storage medium. The at least one processor may implement at least one of a lookup table, a regression curve fit, or an artificial neural network model to autonomously determine a volume of liquid present in the container body based at least in part on the received capacitive sensor signal, temperature sensor signal, and orientation sensor signal. The orientation sensor may include at least one accelerometer. The capacitive sensor may include a first set of conductive surfaces wrapped around at least a portion of the container body; and a second set of conductive surfaces wrapped around at least a portion of the container body, the second set of conductive surfaces disposed radially outward of the first set of conductive surfaces.

A method may be summarized as including providing a container comprising: a container body which defines a volume for receiving a liquid; a capacitive sensor comprising: a first conductive surface helically wrapped at least one full turn around the container body; and a second conductive surface helically wrapped at least one full turn around the container body, the second conductive surface adjacent the first conductive surface and separated therefrom by a first helically shaped gap and a second helically shaped gap; at least one nontransitory processor-readable storage medium which stores at least one of processor-executable instructions or data; and at least one processor communicatively coupled to the at least one nontransitory processor-readable storage medium and the capacitive sensor; receiving, by the at least one processor, a capacitive sensor signal output from the capacitive sensor, the capacitive sensor signal indicative of a capacitance value between the first and second conductive surfaces; autonomously determining, by the at least one processor, a volume of liquid present in the container body based at least in part on the received capacitive sensor signal; and storing, by the at least one processor, the determined volume of liquid in the at least one nontransitory processor-readable storage medium. Autonomously determining a volume of liquid present in the container body may include implementing at least one of a lookup table, a regression curve fit, or an artificial neural network model to autonomously determine a volume of liquid present in the container body based at least in part on the received capacitive sensor signal.

The method wherein the container may further include a temperature sensor which in operation outputs a temperature sensor signal indicative of a temperature of the liquid in the container body, may further include receiving, by the at least one processor, the temperature sensor signal from the temperature sensor; autonomously determining, by the at least one processor, a volume of liquid present in the container body based at least in part on the received capacitive sensor signal and temperature sensor signal; and storing, by the at least one processor, the determined volume of liquid in the at least one nontransitory processor-readable storage medium. Autonomously determining a volume of liquid present in the container body may include implementing at least one of a lookup table, a regression curve fit, or an artificial neural network model to autonomously determine a volume of liquid present in the container body based at least in part on the received capacitive sensor signal and temperature sensor signal.

The method wherein the container may further include at least one user notification indicator which in operation generates a user-perceptible signal, may further include autonomously causing, by the at least one processor, the at least one user notification indicator to generate the user-perceptible signal based at least in part on the determined volume of liquid stored in the at least one nontransitory processor-readable storage medium. Autonomously causing the at least one user notification indicator to generate the user-perceptible signal may include autonomously causing at least one of a light, a speaker, a buzzer, or a vibrator to generate a user-perceptible signal.

The method may further include receiving, by the at least one processor, a trigger signal; and autonomously determining, by the at least one processor, a volume of liquid present in the container body responsive to the received trigger signal. Receiving a trigger signal may include receiving a trigger signal generated based at least in part on an elapsed amount of time. Receiving a trigger signal may include receiving a trigger signal generated based at least in part on a detection of a movement of the container body.

A method may be summarized as including providing a container comprising: a container body which defines a volume for receiving a liquid; a capacitive sensor; a temperature sensor; at least one nontransitory processor-readable storage medium which stores at least one of processor-executable instructions or data; and at least one processor communicatively coupled to the at least one nontransitory processor-readable storage medium, the capacitive sensor, and the temperature sensor; receiving, by the at least one processor, a capacitive sensor signal output from the capacitive sensor, the capacitive sensor signal indicative of a capacitance value of the capacitive sensor which varies based at least in part with the volume of liquid present in the container body; receiving, by the at least one processor, a temperature sensor signal from the temperature sensor, the temperature sensor signal indicative of a temperature of the liquid in the container body; autonomously determining, by the at least one processor, a volume of liquid present in the container body based at least in part on the received capacitive sensor signal and temperature sensor signal; and storing, by the at least one processor, the determined volume of liquid in the at least one nontransitory processor-readable storage medium.

A method may be summarized as including providing a container comprising: a container body which defines a volume for receiving a liquid; a capacitive sensor; an orientation sensor which in operation outputs an orientation sensor signal indicative of an orientation of the container body; at least one nontransitory processor-readable storage medium which stores at least one of processor-executable instructions or data; and at least one processor communicatively coupled to the at least one nontransitory processor-readable storage medium, the capacitive sensor, and the orientation sensor: receiving, by the at least one processor, a capacitive sensor signal output from the capacitive sensor, the capacitive sensor signal indicative of a capacitance value of the capacitive sensor; receiving, by the at least one processor, the orientation sensor signal from the orientation sensor; autonomously determining, by the at least one processor, a volume of liquid present in the container body based at least in part on the received capacitive sensor signal and orientation sensor signal; and storing, by the at least one processor, the determined volume of liquid in the at least one nontransitory processor-readable storage medium.

The method wherein the container may further include a temperature sensor which in operation outputs a temperature sensor signal indicative of a temperature of the liquid in the container body, may further include receiving, by the at least one processor, the temperature sensor signal from the temperature sensor; autonomously determining, by the at least one processor, a volume of liquid present in the container body based at least in part on the received capacitive sensor signal, temperature sensor signal, and orientation sensor signal; and storing, by the at least one processor, the determined volume of liquid in the at least one nontransitory processor-readable storage medium.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 7A is a top plan view of conductive surfaces of a capacitive sensor which includes two sets of parallel plates arranged in quadrature, according to one illustrated implementation.

FIG. 7B is an elevational view of an inner set of conductive surfaces of the capacitive sensor of FIG. 7A shown unwrapped, according to one illustrated implementation.

FIG. 7C is an elevational view of an outer set of conductive surfaces of the capacitive sensor of FIG. 7A shown unwrapped, according to one illustrated implementation.

FIG. 9A is a perspective view of two conductive surfaces of a capacitive sensor which includes two conductive surfaces helically wrapped with two twists or revolutions, according to one illustrated implementation.

FIG. 9B is an elevational view of the two conductive surfaces of the capacitive sensor of FIG. 9A shown unwrapped, according to one illustrated implementation.

FIG. 15 is a perspective view of a capacitive sensor that has two conductive surfaces that may be helically wrapped around a container body, and a conductive sensor shield which may surround the conductive surfaces of the conductive sensor, according to one illustrated implementation.

DETAILED DESCRIPTION

Figure 1:
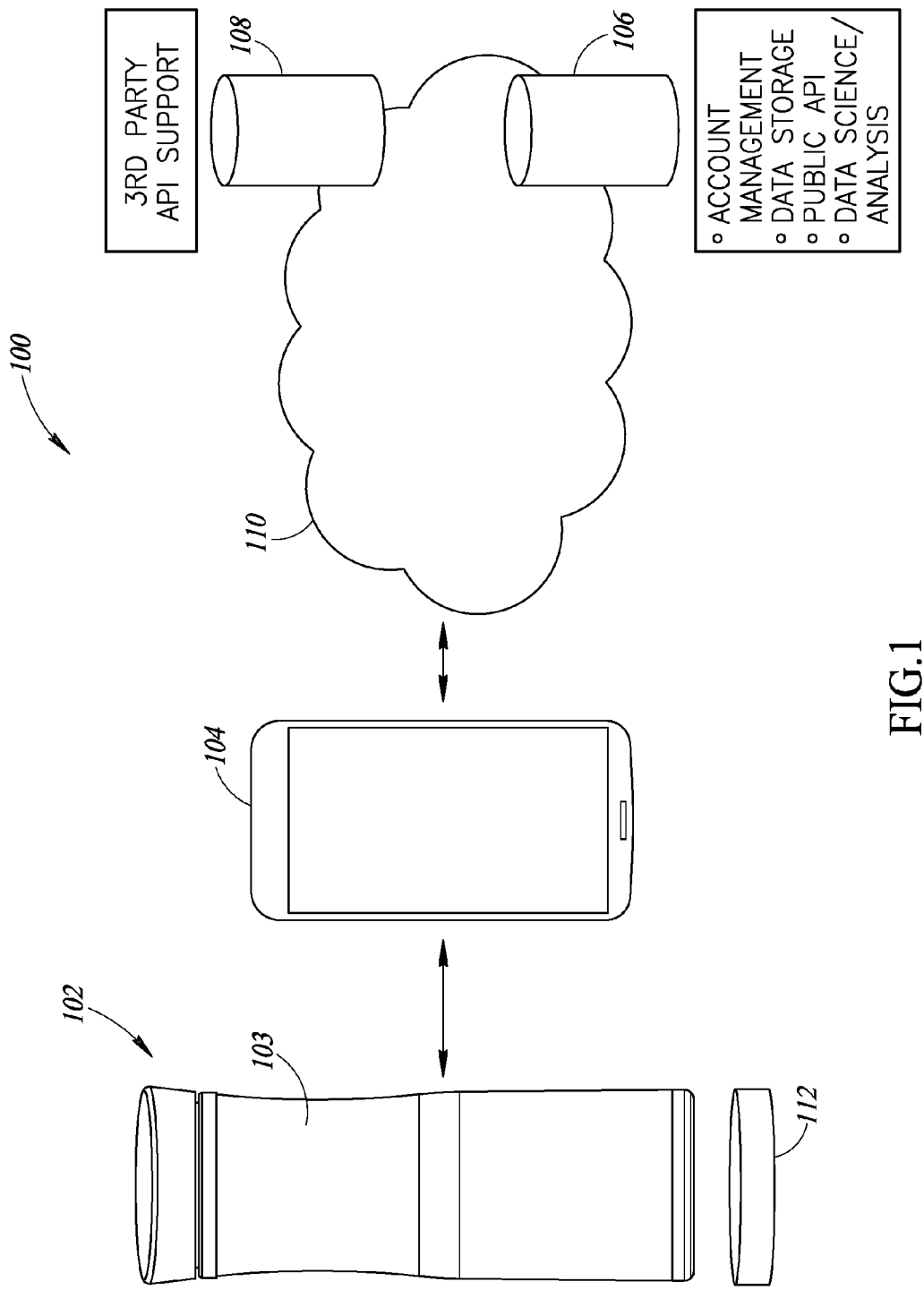
FIG. 1 is a schematic diagram of a hydration system which includes a smart hydration container or bottle, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to a smart hydration container or bottle, mobile application and cloud platform which tracks a user's liquid intake, reminds the user when to take a drink to ensure optimal hydration, and presents historical data to help the user analyze his own patterns and build healthy habits. As discussed further below, the systems and methods disclosed herein provide an effective, accurate, and inexpensive hydration solution for people of all ages and levels of activity.

The smart hydration containers or bottles of the present disclosure utilize a new method for implementing capacitive sensing technology which does not require a complicated design for capacitive conductive surfaces, also referred to as capacitive plates. In some implementations, the systems and methods disclosed herein derive an accurate measurement from capacitance in the tens to hundreds of picofarads (pF). Through the use of calibrated data, the smart hydration containers accurately measure capacitance "as a whole" of the entire container's contents even when the container is not resting upright. This is in contrast to capacitive liquid height sensing methods which only measure the height of the liquid in a container by using one or more vertically disposed capacitors which capacitance varies as a function of the height of the liquid due to different levels of submersion of the one or more capacitors in the liquid.

In some implementations, the smart hydration containers of the present disclosure utilize capacitive sensing which requires no moving parts, which make such containers robust and relatively less prone to sensor damage caused by impacts or other use. Further, the circuitry utilized to implement capacitive sensing is relatively less complicated compared to existing solutions.

In some implementations, the smart hydration containers of the present disclosure utilize a combination of capacitive sensing, motion sensing, position sensing, and/or temperature sensing to provide an accurate measure of liquid volume in the containers. Further, the smart hydration containers may be relatively inexpensive to manufacture due to the simplified sensing technology and methods which may be used to apply the capacitive sensors to the containers. The particular features are discussed further below with reference to FIGS. 1-14.

FIG. 1 shows a block diagram of a hydration system 100 which includes a smart hydration container or bottle 102. The container 102 includes a container body 103 which holds a quantity (e.g., 20 ounces) of liquid (e.g., water). As discussed further below, the container 102 may be operative to measure the volume of liquid present in the container body 103 of the container. The container 102 may be communicatively coupled to a client computing device 104 via a wired and/or wireless connection, and the client computing device may in turn be coupled one or more remote systems 106 and 108 over one or more suitable communications networks 110 (e.g., LAN, WAN, Internet, Worldwide Web, cellular network, USB®, Bluetooth®, Bluetooth® Low Energy, WIFI®, NFC). For example, the client computing device 104 may include a personal computer (e.g., desktop or laptop computer), netbook computer, tablet computer, smart phone, personal digital assistant, wearable computer, etc., associated with the user of the container 102. The container 102 may communicate with the computing device 104 by a short-range wireless communications protocol (e.g., Bluetooth®, Bluetooth® Low Energy, WIFI®, NFC), for example. The remote system 106 may be a remote hydration platform system which provides user account management, data storage, public API, and data analysis. The one or more remote systems 108 may provide third party API support, for example.

The container 102 may be an electrically powered device that is rechargeable by an external wireless power charger 112. In other implementations, the container 102 may be rechargeable by a wired power charger (e.g., USB® power charger, barrel plug) instead of or in addition to a wireless power charger. In some implementations, the container 102 may be powered by one or more replaceable and/or rechargeable batteries. The container 102 may optionally include a user interface that includes one or more inputs (e.g., buttons, touch screen, sensors, microphone) and one or more outputs (e.g., screen, LED(s), speaker(s), buzzer). The user may interact with the user interface to interact with the container 102. As discussed below, in some implementations the user interface may provide information to the user relating to the current volume or historical volume of liquid in the container, or may provide notifications to the user. In some implementations, the container 102 may include a minimal or no user interface and the user may interact with a user interface integrated into the computing device 104 or an interface of another device (e.g., one or more user computing devices communicatively coupled to the container 102). For example, the user may utilize the inputs/outputs of the computing device 104 (e.g., smartphone) to interact (e.g., receive notifications) with a mobile app executing on the computing device which is communicatively coupled to the container 102. As another example, the user may utilize the inputs/outputs of the computing device 104 to interact with a cloud terminal or service communicatively coupled to the container 102, using a web interface as inputs/outputs.

In some implementations, a user may utilize the client computing device 104 to interact with the container 102. For example, the client computing device 104 may execute a program or "app" that provides at least one of instructions or data to the container 102 and receives information from the container via one or more suitable communications interfaces (e.g., NFC, Bluetooth®, Bluetooth® Low Energy, USB®, WIFI®).

The hydration platform system 106 may take the form of one or more server computer systems with associated nontransitory processor-readable storage media or data store. In some implementations or instances, the nontransitory processor- or computer-readable media may include a database or other data structure which stores one or more of: customer identifiers, customer account identifiers, customer identity information, financial account information (e.g., credit and/or debit account numbers, expiration dates, security codes), customer consumption history, captured data, and/or other data or statistics.

The various systems, subsystems, and/or processor-based devices are capable of communications, for example, via the one or more networks 110 which may be, for instance, packet switched communications networks, such as the Internet, Worldwide Web portion of the Internet, extranets, intranets, and/or various other types of telecommunications networks such as cellular phone and data networks or channels, and plain old telephone system (POTS) networks. The type of communications infrastructure should not be considered limiting. The communications networks 110 may take any of a large variety of forms, and may include modems (e.g., DSL modem, cable modem), routers, network switches, and/or bridges, etc.

The container 102 may collect and store sensor data from one or more sensors at fixed or variable time intervals. This collection of data forms a collection of time-series data that may be processed to providing information presentable to a user through a user interface, such as a display of one or more of the client computing devices 104 or a light (e.g., LED) of the container 102.

The container 102 may transmit various data or information to the client computing device 104 and/or to the hydration platform system 106. For example, the container 102 may from time-to-time transmit a subset or all of the collected time-series measurement data to the client computing device 104 or to the hydration platform system 106. In some implementations, the container 102 may transmit only a subset of the collected time-series data that includes the most recent measurement or the measurements obtained since the previous successful transmission of the measurement data to the client computing device 104.

Figure 2:
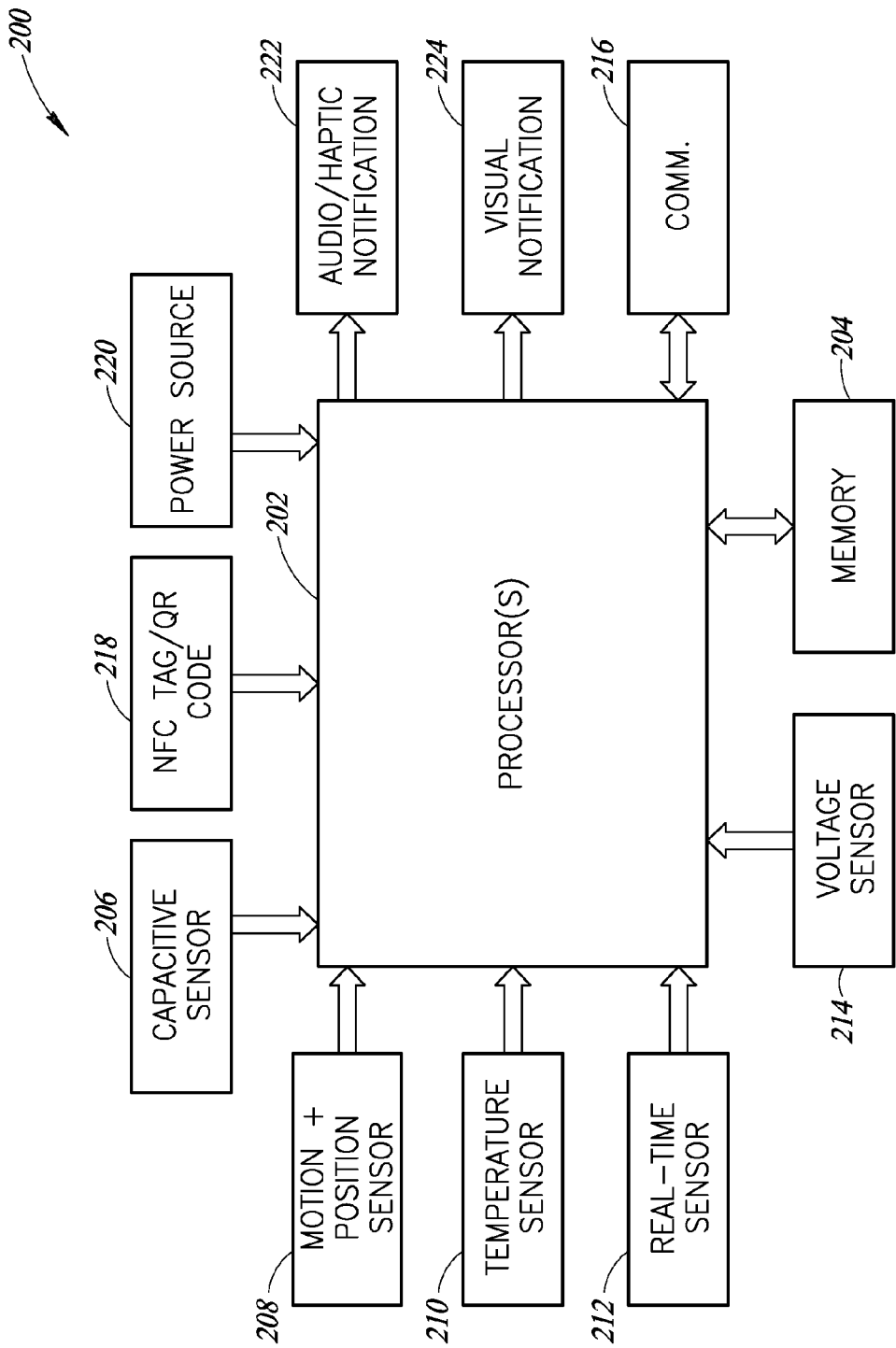
FIG. 2 is a schematic diagram of various components of a smart hydration container, according to one illustrated implementation.

FIG. 2 and the following discussion provide a brief, general description of the components forming an exemplary smart hydration container or bottle 200 in which the various illustrated implementations can be implemented. The smart hydration container 200 may be similar or identical to the container 102 of FIG. 1 discussed above. Although not required, some portion of the implementations will be described in the general context of computer-executable instructions or logic, such as program application modules, objects, or macros being executed by a computer. Those skilled in the relevant art will appreciate that the illustrated implementations as well as other implementations can be practiced with other computer system or processor-based device configurations. The implementations can be practiced in distributed computing environments where tasks or modules are performed by remote processing devices, which are linked through a communications network. In a distributed computing environment, program modules may be located in both local and remote memory storage devices.

The container 200 may include one or more processors 202 (e.g., microcontroller) and nontransitory computer- or processor-readable media 204, for instance one or more nonvolatile memories such as read only memory (ROM) or FLASH memory and/or one or more volatile memories such as random access memory (RAM).

As discussed above, the container 200 may also include one or more sensors or detectors, such as a capacitive sensor 206, a motion/position sensor 208, a temperature sensor 210, a real-time sensor 212, a voltage sensor 214, additional sensors, or any combination thereof. The sensors 206, 208, 210, 212, and 214 may be operatively coupled to the one or more processors 202.

The container 200 may include one or more communications transceivers or radios 216 and associated antennas. For example, the container 200 may include one or more cellular transceivers or radios, one or more WIFI® transceivers or radios, one or more Bluetooth® transceivers or radios, and one or more Bluetooth® Low Energy transceivers or radios, along with associated antennas. The container 200 may further include one or more wired interfaces that utilize parallel cables, serial cables, or wireless channels capable of high speed communications, for instance, via one or more of FireWire®, Universal Serial Bus® (USB), Thunderbolt®, or Gigabyte Ethernet®, for example.

The container 200 may include one or more audio/haptic notification modules 222 which may include a speaker, a buzzer (e.g., piezoelectric), a vibrator (e.g., pager motor), etc. The container 200 may also include one or more visual notification modules 224 which may include one or more lights (e.g., LEDs), one or more displays, etc. For example, the visual notifications module 224 may include multiple colors of LEDs which may be used for notification (e.g., content age, connection/sync) and/or feedback (e.g., target to daily goal).

In some implementations, the container 200 may include a user input/output subsystem, for example including one or more buttons, a touchscreen or touch sensitive display device and one or more speakers. A touchscreen or display device may present a graphical user interface, for example in the form of a number of distinct screens or windows, which include prompts and/or fields for selection. While not illustrated, the user interface may additionally or alternatively include one or more additional input or output devices, for example a microphone, an alphanumeric keypad, a QWERTY keyboard, a joystick, scroll wheel, touchpad or similar physical or virtual input device. For example, the container 200 may include a microphone that allows for voice control of the container.

The container 200 may also include an NFC tag/QR code module 218. For instance, an NFC tag may be placed on the container 200 at a location where the tag is easily accessible by taps with the client computing device 104. The NFC tag may be used to facilitate setup, and/or may be used in a group data setup scenario where the user may be effortlessly added to a group by tapping on the tag with the client computing device 104 when prompted by an application executing on the client computing device 104. The container 200 may also include a machine readable symbol tag (e.g., QR code) on the bottle which allows similar functionality as the NFC tag without requiring the client computing device 104 to be equipped with an NFC tag reader.

Some or all of the components within the container 200 may be communicably coupled using at least one bus or similar structure adapted to transferring, transporting, or conveying data between the devices, systems, or components used within the container 200. The bus 200 can include one or more serial communications links or a parallel communications link such as an 8-bit, 16-bit, 32-bit, or 64-bit data bus. In some implementations, a redundant bus (not shown) may be present to provide failover capability in the event of a failure or disruption of the primary bus.

The processor(s) 202 may include any type of processor (e.g., ARM, Snapdragon, NVidia, Intel, Samsung, Apple, Motorola) adapted to execute one or more machine executable instruction sets, for example a conventional microprocessor, a reduced instruction set computer (RISC) based processor, an application specific integrated circuit (ASIC), digital signal processor (DSP), microcontroller, or similar. Within the processor(s) 202, a non-volatile memory may store all or a portion of a basic input/output system (BIOS), boot sequence, firmware, startup routine, and communications device operating system executed by the processor 202 upon initial application of power. The processor(s) 202 may also execute one or more sets of logic or one or more machine executable instruction sets loaded from the memory 204 subsequent to the initial application of power to the processor 202. The processor 202 may also include a system clock, a calendar, or similar time measurement devices.

In at least some implementations, one or more sets of logic or machine executable instructions providing programs executable by the processor 202 may be stored in whole or in part in at least a portion of the memory 204. In at least some instances, the applications may be downloaded or otherwise acquired by the end user, for example using an online marketplace. In some implementations, such applications may start up in response to selection of a corresponding user selectable icon by the user or consumer. The application can facilitate establishing a data link between the container 200 and the hydration platform system 106 (FIG. 1) or the computing device 104 via the transceivers or radios 216 and communication networks 110.

The one or more processors 202 controls the general purpose inputs and outputs (GPIOs) of the container 200, and captures and processes capacitive, temperature, time, motion, position, and battery voltage sensors, as discussed below. The one or more processors 202 stores data to and retrieves data from the memory 204. The one or more processors 202 also handles communications exchanges with the client computing device 104 via the communications module 222. In some implementations, the one or more processors 202 may also cause the production of light notifications, sound notifications, and vibration notifications.

The motion/position or orientation sensor 208 may comprise one or more position sensing devices (e.g., one or more microelectromechanical systems or "MEMS" accelerometers, gyroscopes, etc.). In some implementations, the orientation sensor 208 includes a low power 3-axis accelerometer which is coupled to the processor 202 via an I2C interface. The orientation sensor 208 may be used to provide information relating to the pitch, roll and yaw of the container 200 to assist in the determination of capacitance, which is used to determine the volume of liquid in the container. Additionally, in some implementations, the orientation sensor 208 may be used as a trigger for logging the volume of liquid in the container when motion is detected, or to trigger interaction with the client computing device 104 when predetermined container "gestures" are detected.

The temperature sensor 210 may include one or more of a thermocouple, thermistor, platinum resistance temperature detector (RTD), positive temperature coefficient (PTC) heater/element, blackbody/infrared emissions detector, etc. In some implementations, the temperature sensor is positioned proximate a base of the container 200. The temperature sensor 210 may be optionally used to provide temperature based compensation to the capacitance measurements, which provides more accurate liquid volume measurements. The temperature sensor 210 may also be used to log discrete events, such as cold, normal, hot, too hot, etc.

Figure 3:
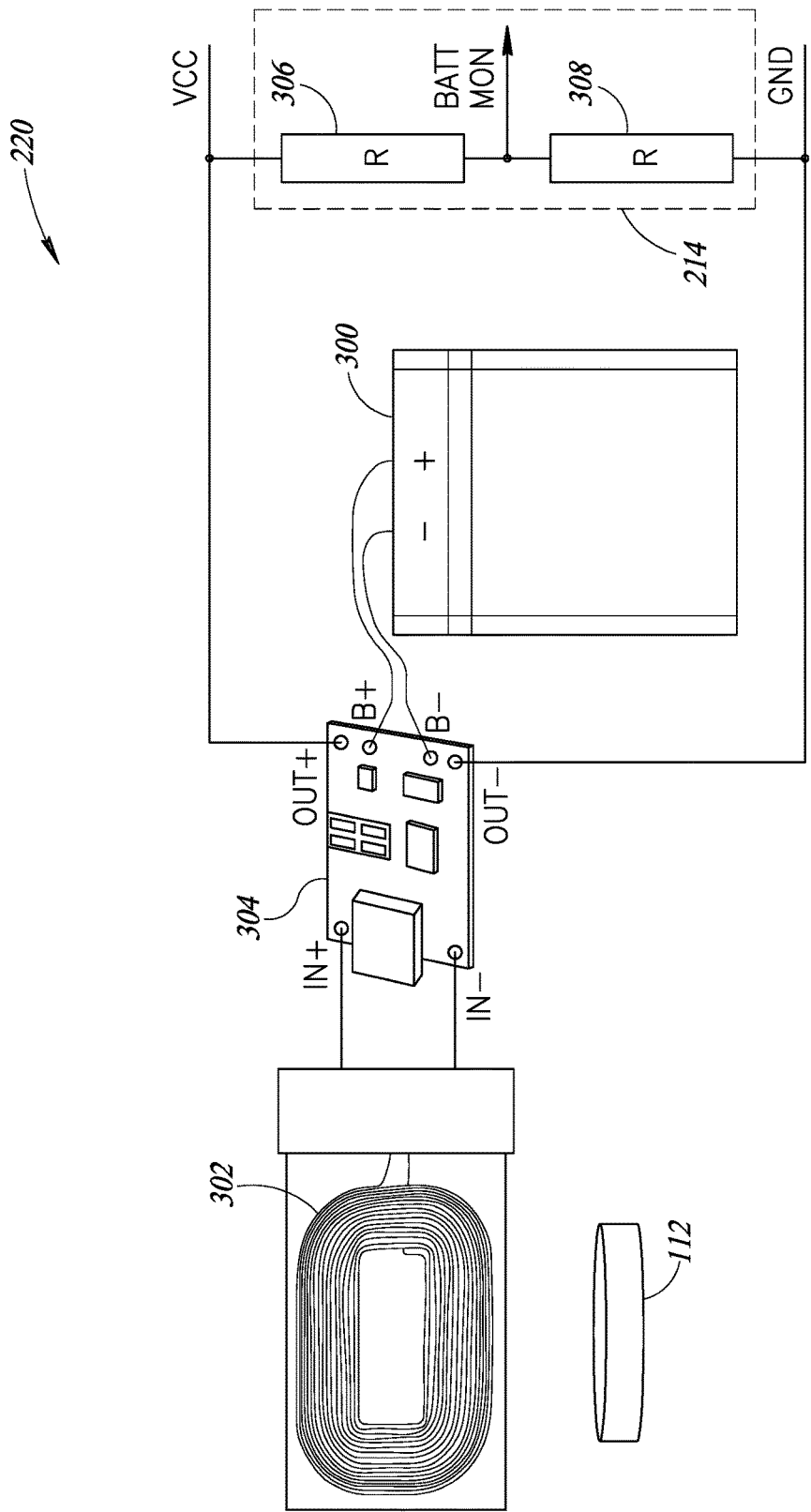
FIG. 3 is a schematic diagram of a power source of a smart hydration container, according to one illustrated implementation.

As shown in FIG. 3, the container 200 may also include a power source 220 which includes a battery 300, a wireless charging coil 302, and a battery charger controller 304. The battery 300 may be a 3.7 V lithium ion polymer ("LiPo") battery, for example. The external wireless charging power source 112 may include an inductive charging transmitter which includes a transmitter coil and a power cable (e.g., USB) which may be coupled to an AC power adaptor or a DC power source (e.g., USB port of a computing device).

The voltage sensor 214 (see FIGS. 2 and 3) may in some implementations include a voltage divider circuit which includes resistors 306 and 308. The voltage sensor 214 is used to inform the processor 202 of the power level status of the battery 300. For example, the output of the voltage sensor 214 may be read using an analog to digital GPIO pin of the processor 202 so that appropriate action may be taken. Such action may include, for example, reporting battery status information via notification modules 222 or 224 of the container 200, and/or reporting battery status information to the client computing device 104 via the communication module 216.

In some implementations, some of the components of the container 200 may be embodied in a separate computing device (e.g., client computing device 104, remote system 106). In some implementations, the container 200 may be an integrated device that includes some or all of the aforementioned components. Further, it should be appreciated that although certain functions are described herein as being implemented in one of the client computing device 104, the container 102, or the hydration platform system 106, some or all of such functions may be performed by numerous combinations of these devices, or may be performed in a different one or more of the devices than described above. In other words, the functionality described herein may be implemented in a highly distributed manner or may be implemented in a single self-contained device.

Figure 4A:
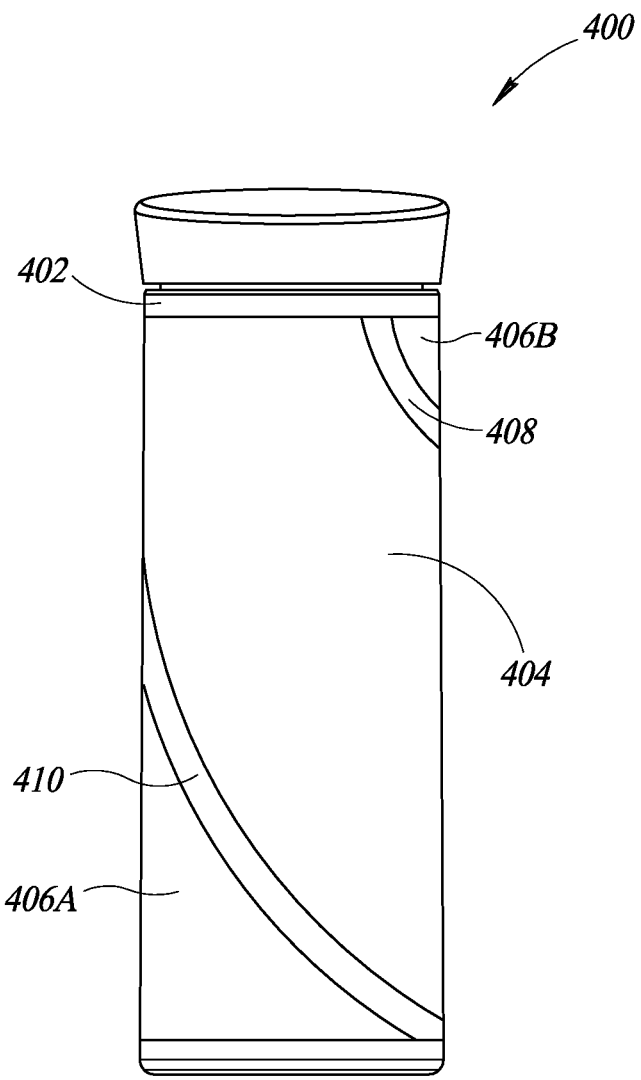
FIG. 4A is a perspective view of a smart hydration container which includes a capacitive sensor that has two conductive surfaces helically wrapped around a container body, according to one illustrated implementation.
Figures 10A, 10B:
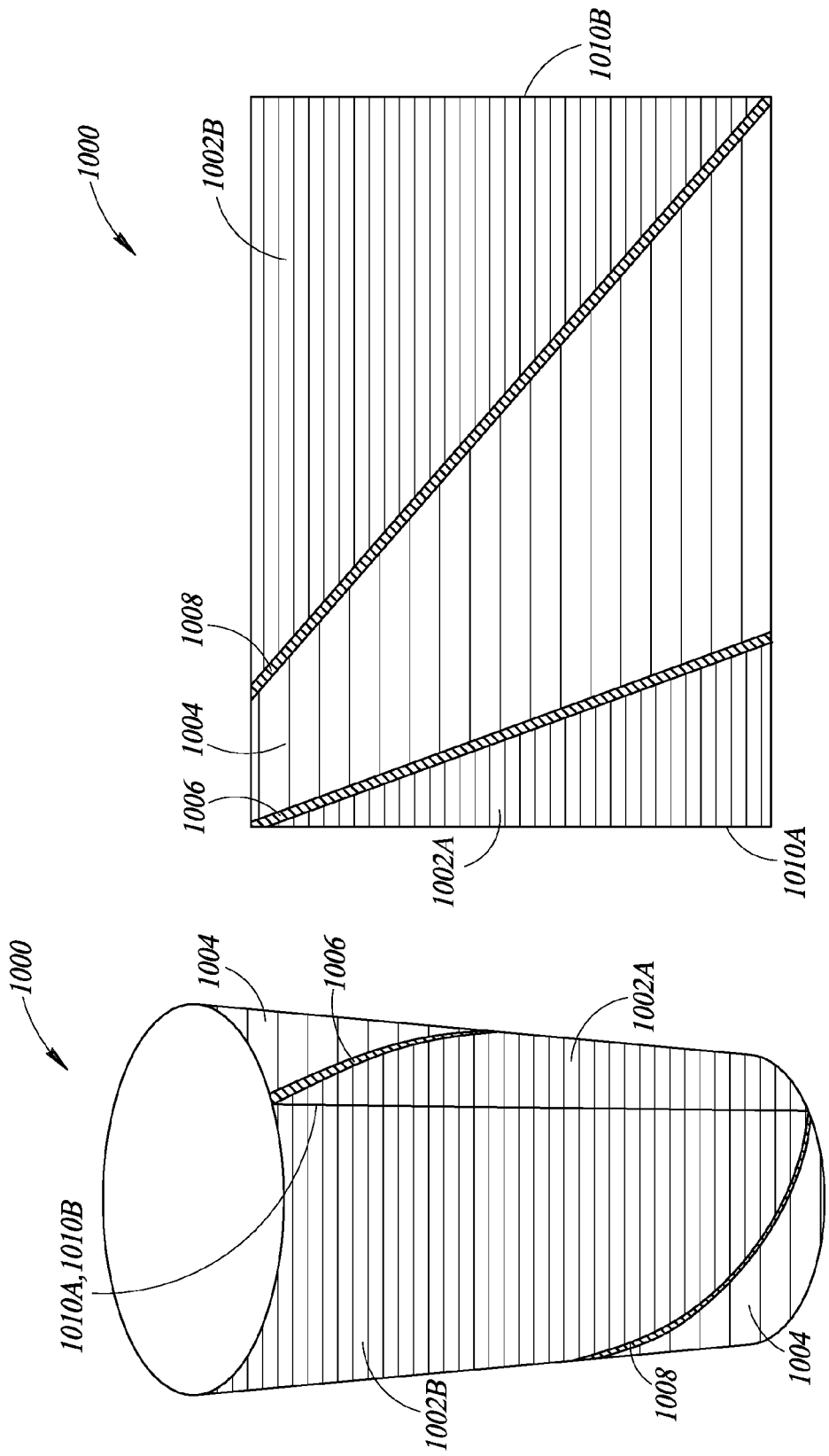
FIG. 10A is a perspective view of two conductive surfaces of a capacitive sensor which includes two non-parallel conductive surfaces helically wrapped with a single twist or revolution, according to one illustrated implementation.
FIG. 10B is an elevational view of the two conductive surfaces of the capacitive sensor of FIG. 10A shown unwrapped, according to one illustrated implementation.

FIGS. 4A-10B illustrate various configurations for the conductive surfaces of capacitive sensors which may be used in implementations of the present disclosure. Each of these capacitive sensors measure the capacitance using substantially the entire volume of the container, which provides corresponding measurements based on the entire container's contents. Specifically, FIGS. 4A-4C show a capacitive sensor which includes two helically wrapped parallel conductive surfaces or plates which are each wrapped one twist or revolution around a container body, FIGS. 5A-5C show a capacitive sensor which includes a single conductive surface, FIGS. 6A-6C show a capacitive sensor which includes two parallel conductive surfaces, FIGS. 7A-7C show a capacitive sensor which includes two sets of parallel conductive surfaces in quadrature, FIGS. 8A-8B show a capacitive sensor which includes two narrow helically wrapped parallel conductive surfaces which are each wrapped one twist or revolution, FIGS. 9A-9B show a capacitive sensor which includes two helically wrapped parallel conductive surfaces which are each wrapped two twists or revolutions, and FIGS. 10A-10B show a capacitive sensor which includes two helically wrapped non-parallel conductive surfaces which are each wrapped one twist or revolution.

In the implementations discussed herein, a capacitive sensor is used to capture the changes in liquid volume in the container using the fact that the liquid (e.g., water) and air have different dielectric properties. Specifically, the dielectric constant (relative permittivity) of water, $\in_r=80.4$ at 20° C., whereas air has an $\in_r=1.013$. A partially filled container may be modeled as two capacitors in parallel, where the total capacitance is $C_{total}=C_{water}+C_{air}$. When the water volume (level) varies, $C_{water}$ and $C_{air}$ vary accordingly, causing $C_{total}$ to change as well. In the examples discussed herein, $C_{water}$ and $C_{air}$ are implemented as part of the same conductive surfaces or plates and the plates are arranged around the container in a manner conducive to the optimal and accurate capture of the capacitance.

Although an analytic model of the capacitance can be derived based on the basic formula $C=\in S/d$, where c is the permittivity, S is the surface area for the plates, and d is the distance between plates, the bottle geometry and the three dimensional configuration of the plates makes this derivation relatively complex. To avoid such complex model, the implementations discussed herein collect calibration data that pairs the capacitance and other known real-time measurements (e.g., temperature, orientation) to known liquid volume. Then, after this calibration process, one of several methods may be used to accurately estimate the volume of liquid in the container.

The conductive surfaces of the capacitive sensors discussed herein may be formed in several ways. For example, the conductive surfaces may be formed of aluminum foil plates, using an inexpensive aluminum sheet applied to the container and glued or taped down to adhere to the surface thereof. As another example, the conductive surfaces may be formed of copper adhesive tape. As another example, the conductive surfaces may be formed of conductive paint (opaque or transparent) with a surface resistivity on the order of 55Ω per sq @ 50 microns, for example. The paint may be applied in the desired configuration directly on the liquid container and may in some implementations be isolated by a layer of plastic to avoid short circuiting the painted plates. As another example, the conductive surfaces may be formed of indium tin oxide (ITO) coated PET plastic, which is a transparent conductive film applied to the liquid container. The use of transparent film may be desirable in applications where seeing the liquid inside the container is desired. The surface resistivity of such material may be rated at 50Ω per square inch, for example. As another example, the conductive surfaces may be formed of conductive 3D printing filament and applied to the surface of the liquid container. Such material may have a volume resistivity rated at 0.6 Ω-cm to 115 Ω-cm, for example.

Figure 4C:
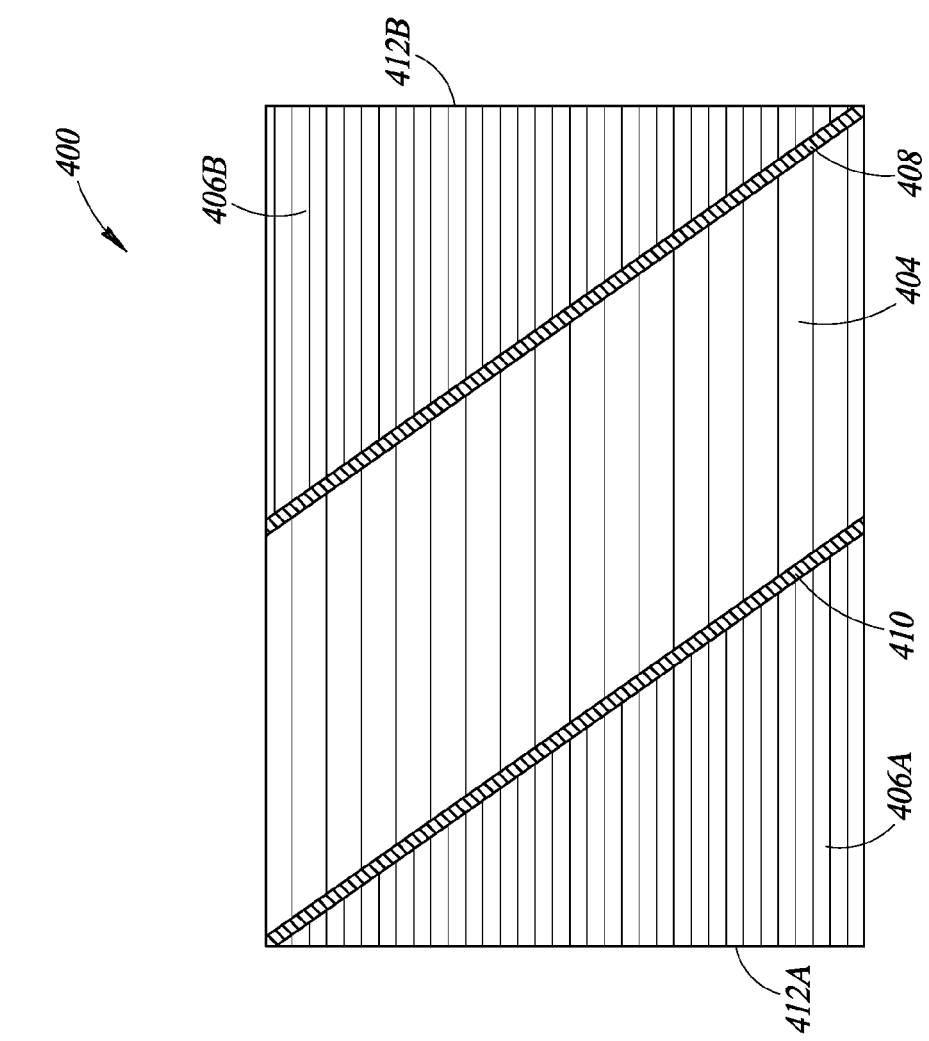
FIG. 4C is an elevational view of the conductive surfaces of FIG. 4A shown "unwrapped" from the container body as a planar sheet which maps to the curved lateral surface of the container body, according to one illustrated implementation.
Figure 4B:
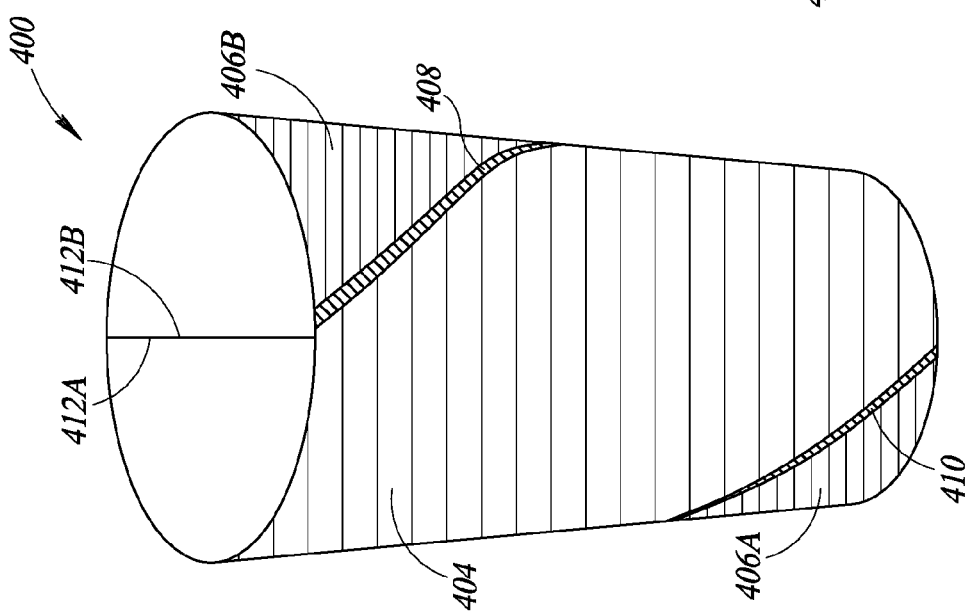
FIG. 4B is a perspective view of the conductive surfaces of the smart hydration container of FIG. 4A, according to one illustrated implementation.

FIGS. 4A-4C show a capacitive sensor 400 that includes two helically wrapped parallel conductive surfaces or plates 404 and 406 (406A and 406B) which are each wrapped one twist or revolution around a container body 402 of a container. In the illustrated examples, the container body 402 has a curved lateral surface which is substantially cylindrical, but the present disclosure is not limited by such shape. For illustrative purposes, FIG. 4C shows the capacitive sensor 400 as an "unwrapped" planar sheet which maps to the curved lateral surface area of the container body 402. FIGS. 5C, 6C, 7B, 7C, 8B, 9B and 10B provide similar illustrations for other implementations of capacitive sensors discussed herein. For example, for a cylindrical container body 402 having a radius r and a height h, the planar sheet in FIG. 4C has a corresponding height h and a length 2πr which extends between edges 412A and 412B. The conductive surfaces 404 and 406 are separated by gaps 408 and 410. Such gaps 408 and 410 may be areas on the surface of the container which do not have conductive surfaces, or the gaps may be formed by a nonconductive material positioned adjacent the conductive surfaces 404 and 406 on the surface of the container body 402. In FIG. 4C the conductive surface 406 is shown as two separate portions 406A and 406B for illustrative purposes as an unwrapped planar sheet, but it should be appreciated that in some implementations the conductive surface 406 may a single integrated surface. The helically wrapped configuration of the conductive surfaces 404 and 406 advantageously provides a capacitive element that allows each conductive surface to be adjacent the liquid in the container body 402 regardless of the orientation of the container. In the example of FIGS. 4A-4C, the conductive surfaces 404 and 406 of the capacitive sensor 400 may occupy a majority (e.g., greater than 50 percent, greater than 80 percent, greater than 95 percent) of the curved lateral surface area of the container body 402.

Figure 5A:
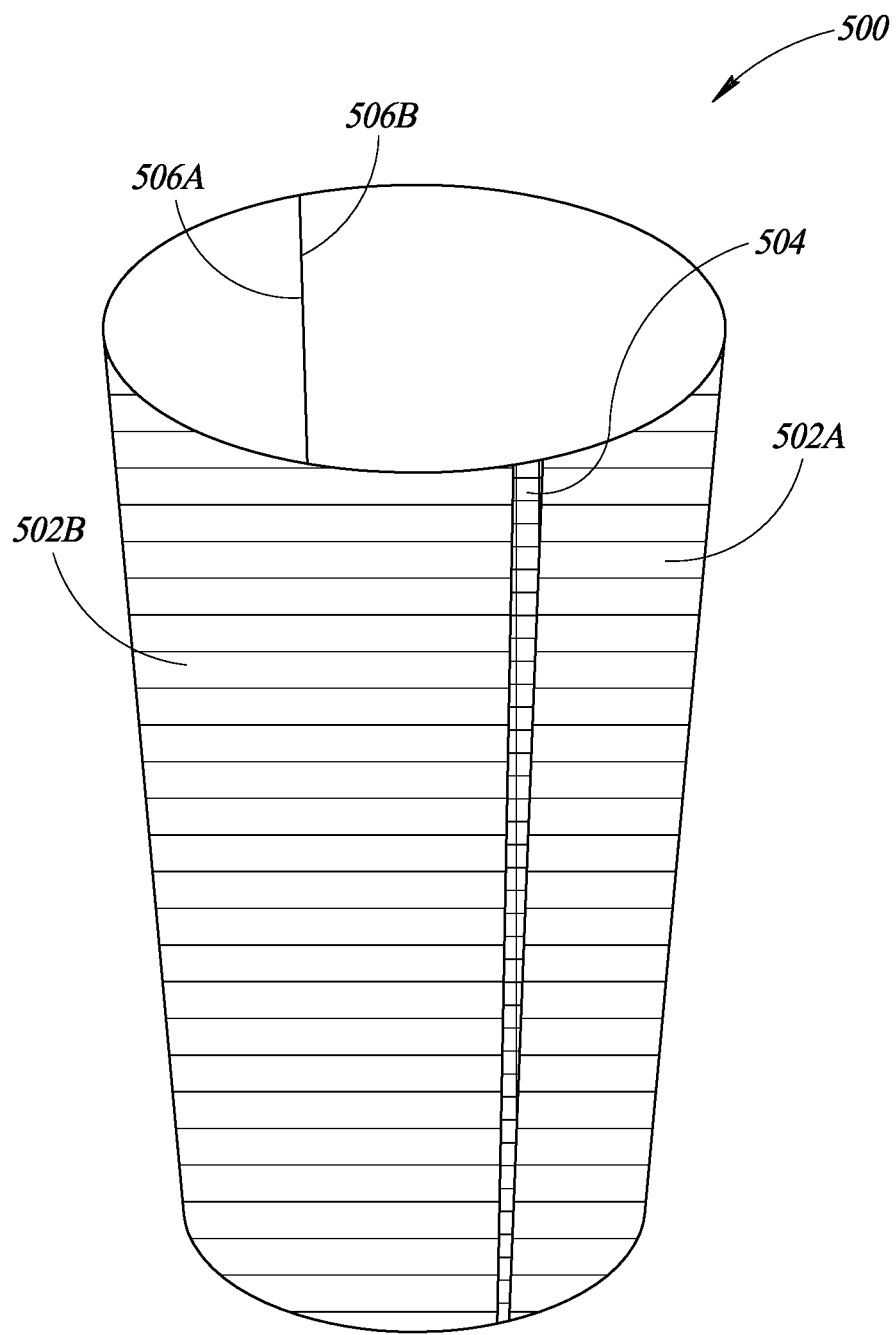
FIG. 5A is a perspective view of a conductive surface of a capacitive sensor which includes a single plate, according to one illustrated implementation.
Figure 5B:
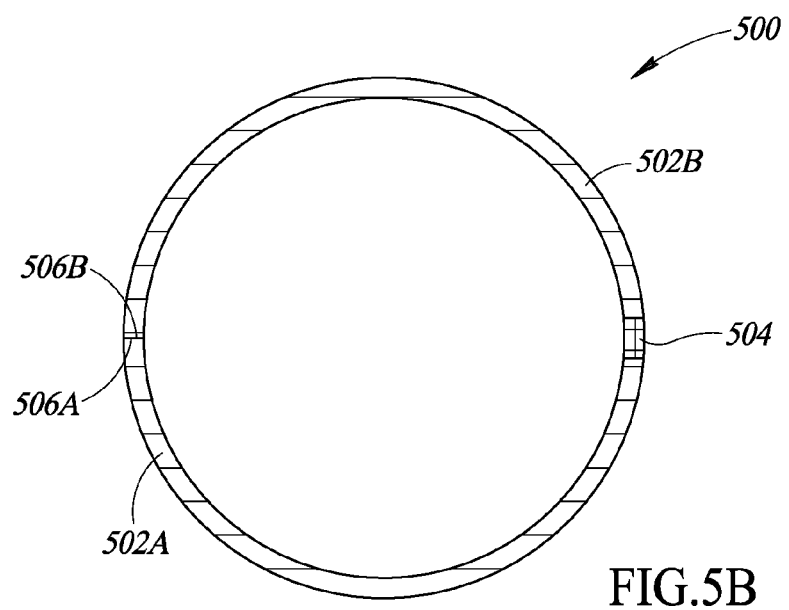
FIG. 5B is a top plan view of the conductive surface of FIG. 5A, according to one illustrated implementation.
Figure 5C:
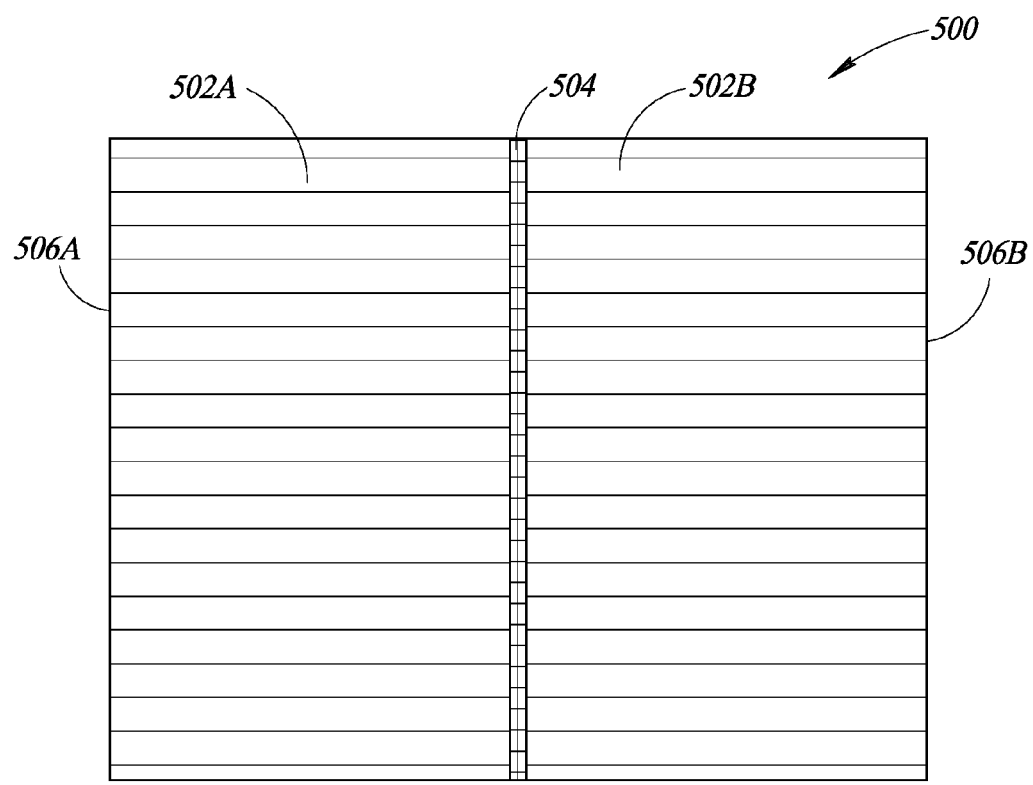
FIG. 5C is an elevational view of the conductive surface of FIG. 4A shown unwrapped, according to one illustrated implementation.

FIGS. 5A-5C show a capacitive sensor 500 formed of a single conductive surface 502 (502A and 502B) separated by a gap 504. FIG. 5C shows the capacitive sensor 500 as a planar sheet having edges 506A and 506B. In this example, a first terminal of a circuit may be coupled to the conductive surface 502 and a second terminal may be coupled to a ground node to obtain the capacitance measurements. The conductive surface 502 covers substantially all of the curved lateral surface of the container body except for the gap 504, which causes any changes in the volume of liquid in the container to cause corresponding changes to the measured capacitance, thus providing accurate volume measurements.

Figure 6A:
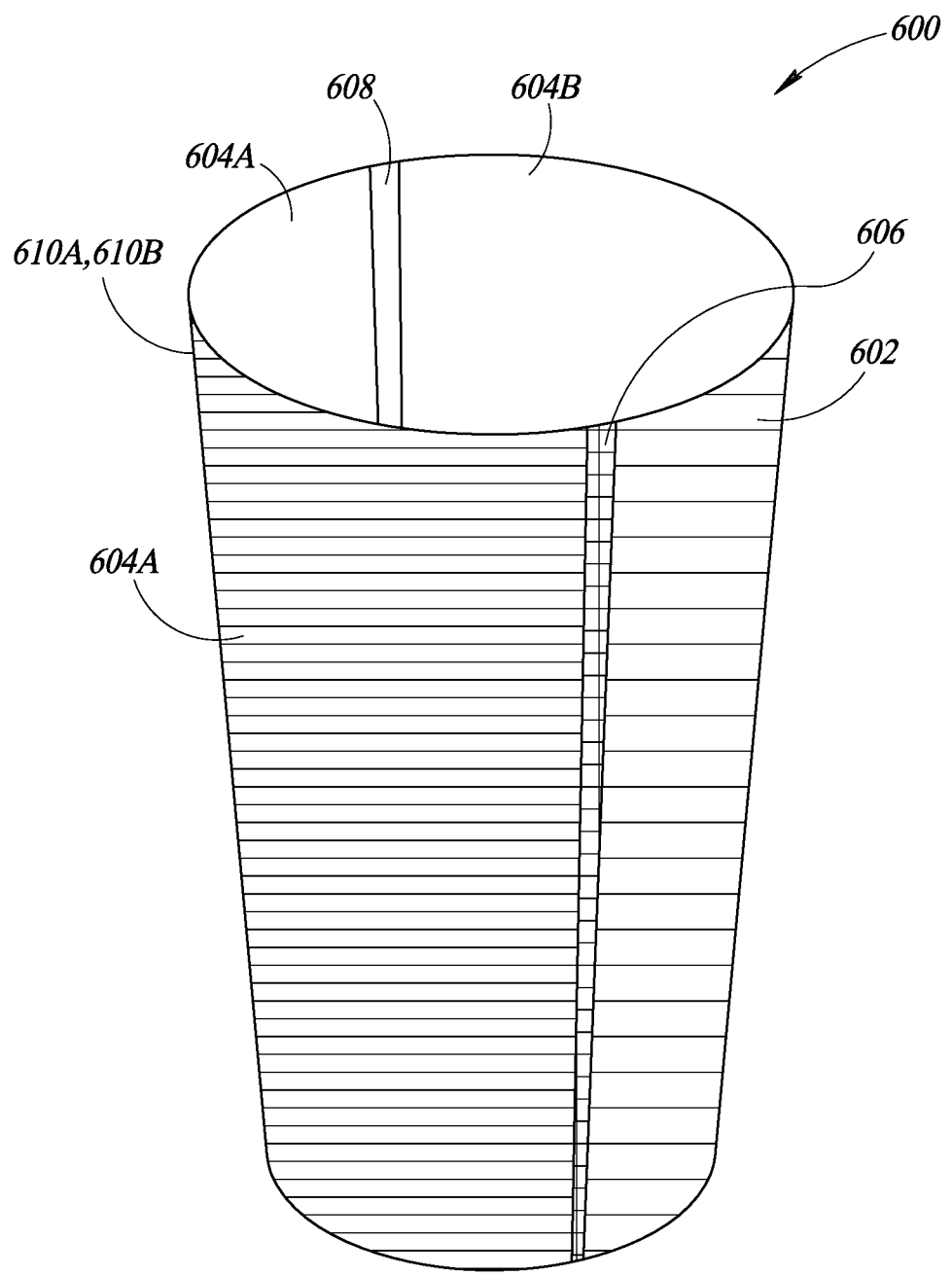
FIG. 6A is a perspective view of two conductive surfaces of a capacitive sensor which includes two parallel conductive surfaces, according to one illustrated implementation.
Figure 6B:
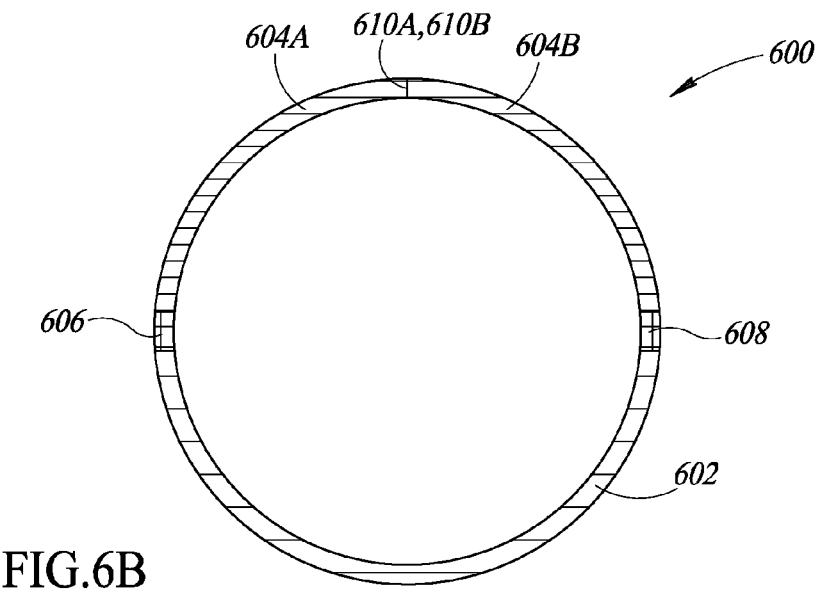
FIG. 6B is a top plan view of the conductive surfaces of FIG. 6A, according to one illustrated implementation.
Figure 6C:
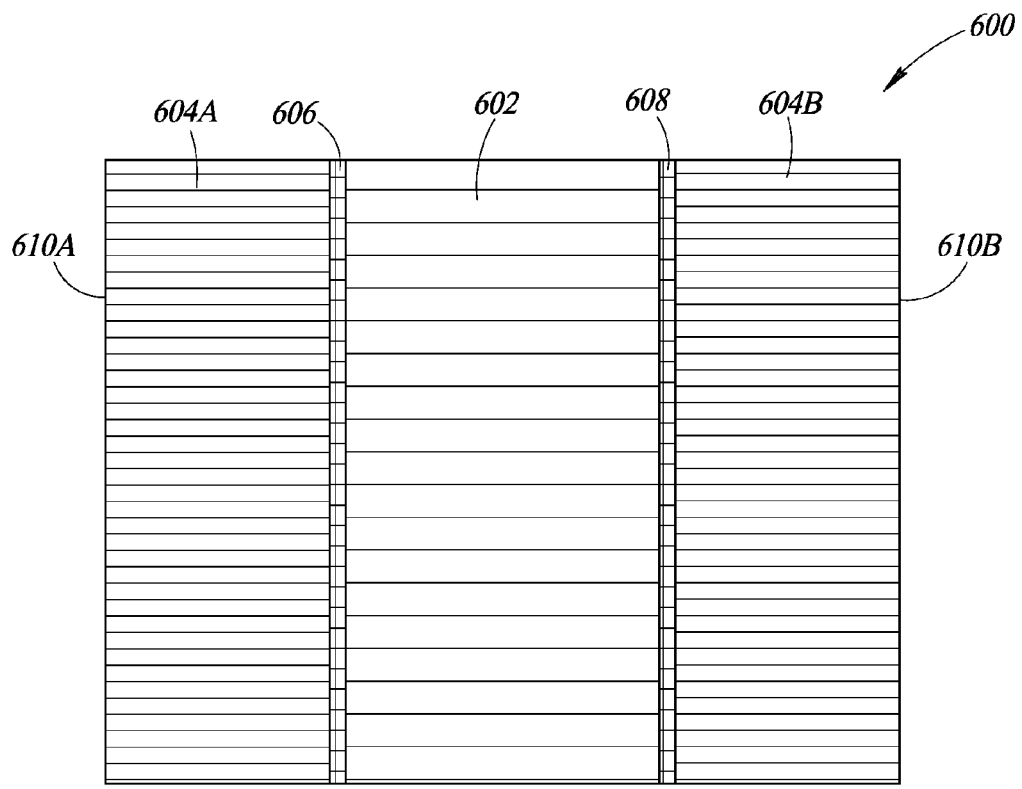
FIG. 6C is an elevational view of the conductive surfaces of FIG. 6A shown unwrapped, according to one illustrated implementation.

FIGS. 6A-6C show a capacitive sensor 600 formed of two parallel conductive surfaces 602 and 604 (604A and 604B) separated by gaps 606 and 608. In FIG. 6C, the capacitive sensor 600 is shown as an unwrapped planar sheet having edges 610A and 610B, and the conductive surface 604 is shown as portions 604A and 604B separated by gaps 606 and 608 and conductive surface 602. As shown in FIGS. 6A and 6B, each of the conductive surfaces 602 and 604 occupy slightly less than half of the curved lateral surface area of a container body (not shown for clarity).

FIGS. 7A-7C show a capacitive sensor 700 which comprises two sets of parallel conductive surfaces arranged in quadrature. In particular, FIG. 7B shows an inner capacitive sensor 702 as an unwrapped planar sheet and FIG. 7C shows an outer capacitive sensor 704 as an unwrapped planar sheet. As shown in FIG. 7A, the inner capacitive sensor 702 may be wrapped around a container body (not shown for clarity) and the outer capacitive sensor 704 may be wrapped around the inner capacitive sensor. In practice, the capacitive sensors 702 and 704 may be electrically isolated from each other by a nonconductive insulating layer (e.g., plastic).

As shown in FIG. 7B, the inner capacitive sensor 702 comprises a first conductive surface 706 and a second conductive surface 708 (708A and 708B). Gaps 710 and 712 separate the first surface 706 from the second surface 708. As shown in FIG. 7C, the outer capacitive sensor 704 comprises a third conductive surface 716 and a fourth conductive surface 718. Gaps 720 and 722 separate the third surface 716 from the fourth surface 718.

As shown best in FIG. 7A, the capacitive sensor 702 is positioned in quadrature with the capacitive sensor 704. That is, the first and second conductive surfaces 706 and 708 are offset from the third and fourth conductive surfaces 716 and 718 by 90 degrees. The capacitances of the capacitive sensors 702 and 704 may be measured independently as separate measurements, or the capacitances may be combined (e.g., in parallel) as a single capacitive measurement.

Figures 8A, 8B:
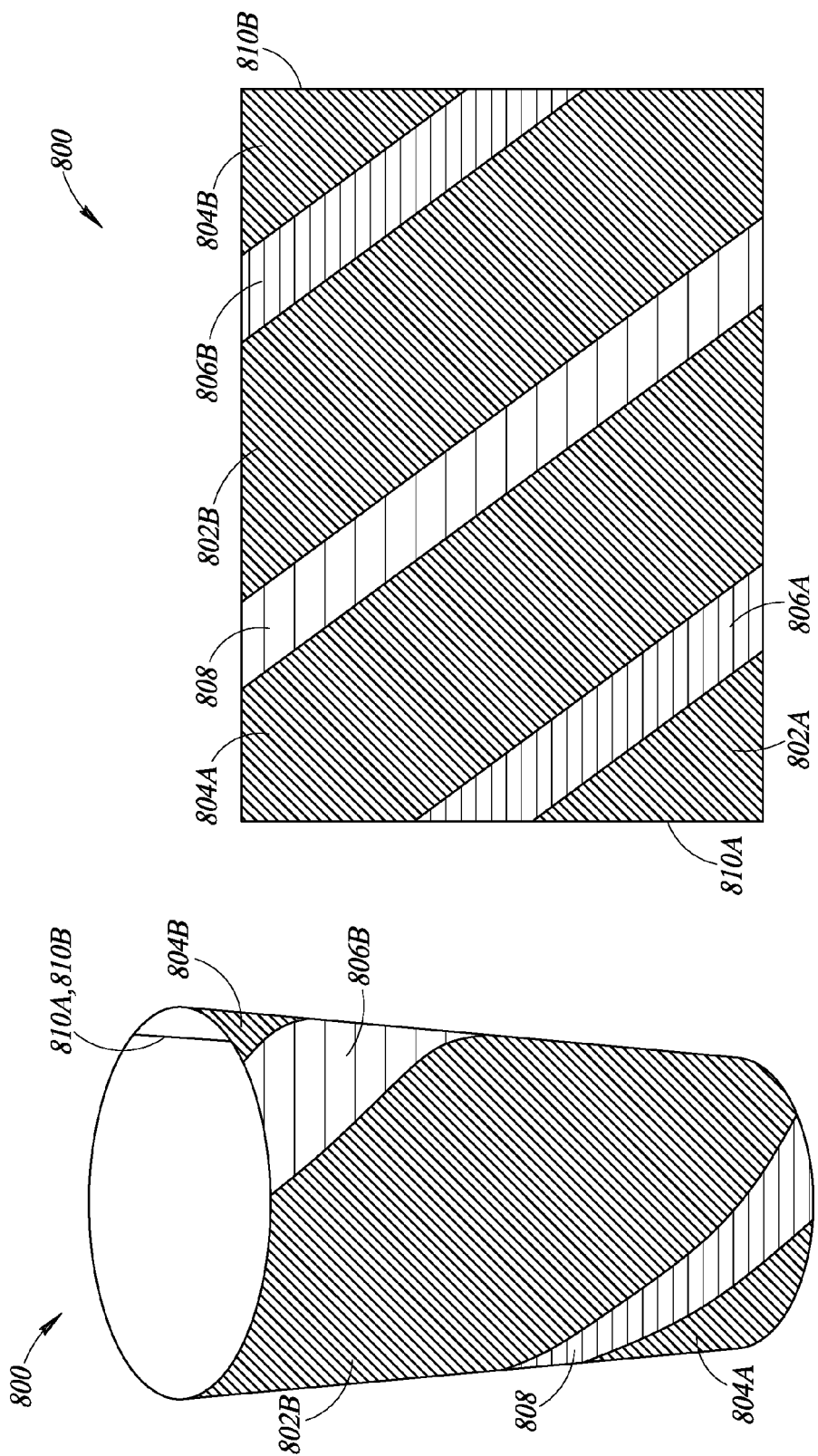
FIG. 8A is a perspective view of two conductive surfaces of a capacitive sensor which includes two conductive surfaces helically wrapped with a single twist or revolution, according to one illustrated implementation.
FIG. 8B is an elevational view of the two conductive surfaces of the capacitive sensor of FIG. 8A shown unwrapped, according to one illustrated implementation.

FIGS. 8A-8B show a capacitive sensor 800 which includes two relatively narrow helically wrapped parallel conductive surfaces 806 (806A and 806B) and 808 which are each wrapped one twist or revolution around a container body (not shown for clarity). The capacitive sensor 800 includes relatively wide helically shaped gaps 802 (802A and 802B) and 804 (804A and 804B) which separate the conductive surfaces 806 and 808. In this example, the conductive surfaces 806 and 808 together occupy less surface area on the container body than the gaps 802 and 804, whereas in other illustrated implementations the conductive surfaces of the capacitive sensors occupy more than 50 percent of the curved lateral surface area of the container body. In FIG. 8B, the capacitive sensor 800 is shown as a planar sheet with a length which extends between edges 810A and 810B.

FIG. 9A-9B show a capacitive sensor 900 which includes two helically wrapped parallel conductive surfaces 902 (902A and 902B) and 904 (904A and 904B) which are each wrapped two twists or revolutions around the container body (not shown for clarity). The conductive surfaces 902 and 904 are separated by gaps 906 (906A and 906B) and 908. In FIG. 9B, the capacitive sensor 900 is shown as a planar sheet with a length which extends between edges 910A and 910B. In other implementations, conductive surfaces may be wrapped more than two (e.g., three, four, eight) twists or revolutions around the container body.

FIGS. 10A-10B show a capacitive sensor 1000 which includes two helically wrapped non-parallel conductive surfaces 1002 (1002A and 1002B) and 1004 which are each wrapped one twist or revolution around the container body (not shown for clarity). The conductive surfaces 1002 and 1004 are separated by gaps 1006 and 1008. In FIG. 10B, the capacitive sensor 1000 is shown as a planar sheet with a length which extends between edges 1010A and 1010B. Although the conductive surfaces 1002 and 1004 are of different shapes, in some implementations the surfaces may have at least substantially equal surface areas.

Figure 11:
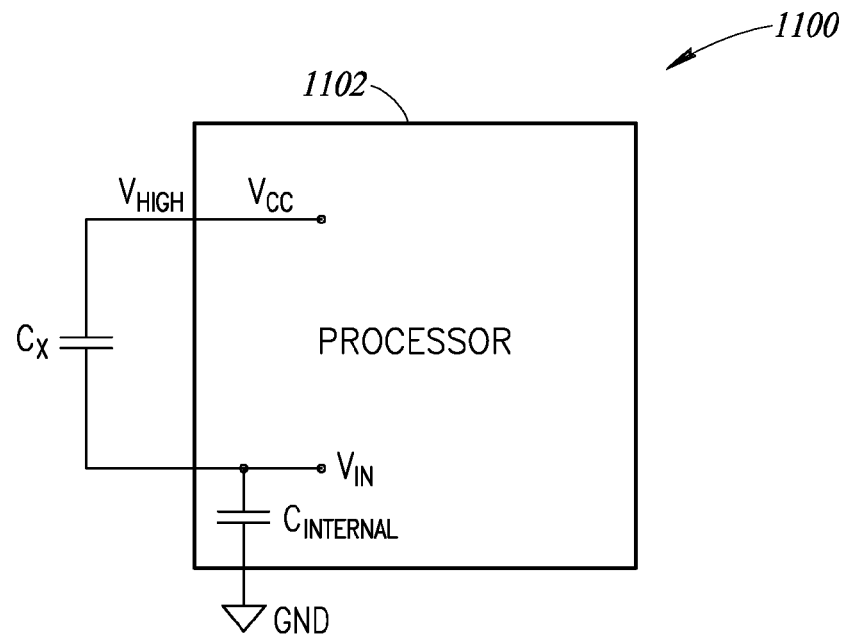
FIG. 11 is a schematic diagram of an example capacitive measurement circuit which includes a capacitive voltage divider, according to one illustrated implementation.

FIG. 11 shows a schematic diagram for a circuit 1100 which may be used to measure the capacitance $C_x$ of a capacitive sensor. For example, the capacitive sensor may represent any of the capacitive sensors 400, 500, 600, 700, 800, 900 and 1000 discussed above with reference to FIGS. 4A-10B, respectively. In this example, the capacitance sensor is part of a voltage divider circuit which includes the sensor capacitance $C_x$ and an internal capacitance $C_{INTERNAL}$ of a processor 1102 at an input node $V_{IN}$ of the processor. In operation, the processor 1102 applies a voltage ($V_{HIGH}=V_{CC}$) to charge the sensor capacitance $C_x$ and internal capacitance $C_{INTERNAL}$ and reads the voltage at the input node $V_{IN}$.

The sensor capacitance $C_x$ is determined by the following formula:

$$C_x = \frac{C_{INTERNAL}}{V_{high} - V_{in}} \times V_{in} \qquad (1)$$

Optionally, during a calibration step known capacitance values may be used to determine the internal capacitance $C_{INTERNAL}$. During active measurement, the processor 1102 determines the sensor capacitance using the algorithm described above.

Figure 12:
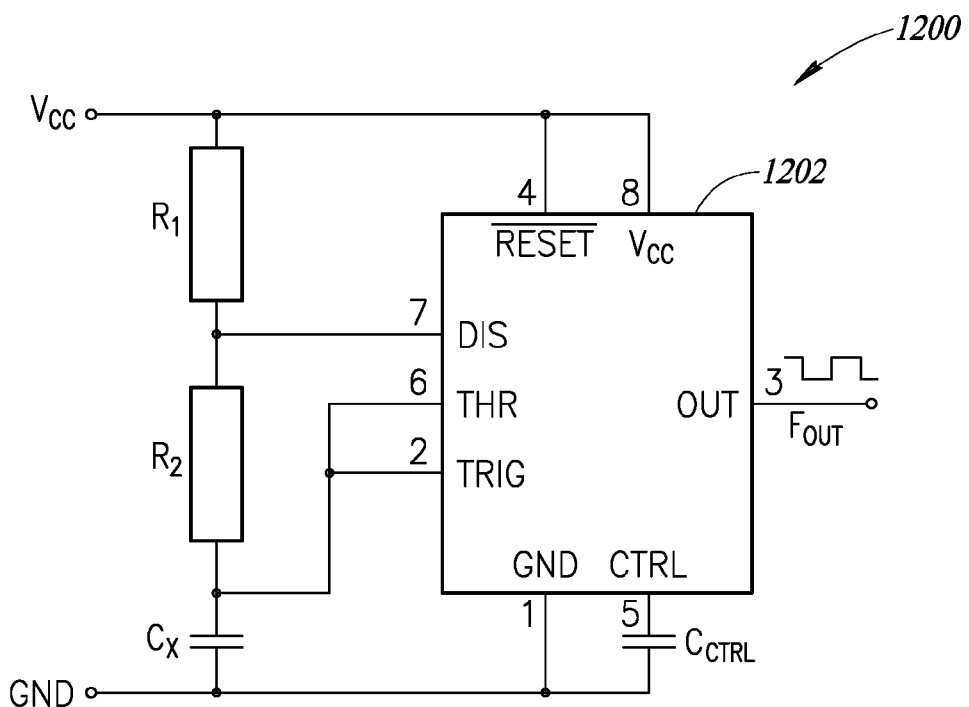
FIG. 12 is a schematic diagram of an example capacitive measurement circuit which includes utilizes a 555 timer circuit operating in an astable mode, according to one illustrated implementation.

FIG. 12 shows a schematic diagram for a circuit 1200 which may be used to measure the capacitance $C_x$ of a capacitive sensor. The circuit 1200 includes the capacitive sensor, a 555 timer integrated circuit 1202, a resistor $R_1$, a resistor $R_2$, and a control capacitor $C_{CTRL}$. In this example, the capacitive sensor wrapped around the container is part of a frequency determining capacitor in a 555 timer bistable circuit. In bistable mode, the 555 timer circuit 1202 outputs via an output pin (pin 3) a continuous stream of rectangular pulses having a specified frequency. The resistor $R_1$ is connected between $V_{CC}$ and a discharge pin (pin 7) and the resistor $R_2$ is connected between the discharge pin (pin 7) and a trigger pin (pin 2) and threshold pin (pin 6) that share a common node. Thus, the capacitive sensor having a capacitance $C_x$ is charged through resistors $R_1$ and $R_2$, and discharged only through $R_2$, since the discharge pin 7 has low impedance to ground during output low intervals of the cycle, therefore discharging the capacitor.

The output pin (pin 3) of the 555 timer circuit 1202 may be communicatively connected to a processor (e.g., processor 202 of FIG. 2) which estimates the frequency $F_{out}$ of the incoming square wave. The frequency $F_{out}$ is inversely related to the capacitance by the following formula:

$$F_{out} = \frac{1}{\ln(2) \times C_x (R_1 + 2R_2)} \quad (2)$$

$$K = \ln(2) \times (R_1 + 2R_2) \quad (3)$$

$$C_x = \frac{1}{K \times F_{out}} \quad (4)$$

To calibrate the circuit 1200, a frequency-to-capacitance table may be generated using known capacitance values. During active measurement, the processor determines $C_x$ by applying the acquired $F_{out}$ to the formula (4) shown above.

Figure 13:
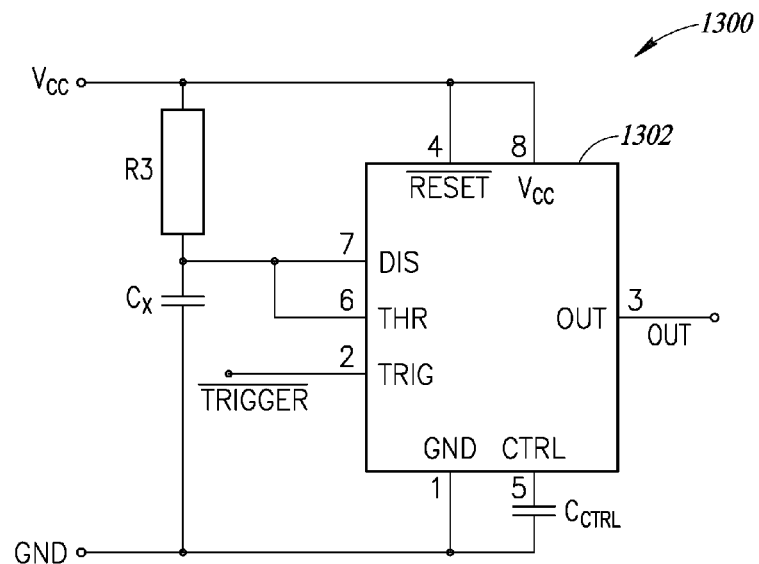
FIG. 13 is a schematic diagram of an example capacitive measurement circuit which includes utilizes a 555 timer circuit operating in a monostable mode, according to one illustrated implementation.

FIG. 13 shows a schematic diagram for a circuit 1300 which may be used to measure the capacitance $C_x$ of a capacitive sensor. Like the circuit 1200, the circuit 1300 includes a 555 timer circuit 1302. In this example, the capacitive sensor wrapped around the liquid container is part of a frequency determining capacitor in a 555 timer monostable circuit. The output pin (pin 3) of the 555 timer circuit 1302 is coupled to a processor (e.g., processor 202 of FIG. 2) which estimates the duration of the pulse. The pulse duration (t) is related to the capacitance $C_x$ of the capacitive sensor by the following formulas:

$$t = \ln(3) \times RC_x \approx 1.1 RC_x \quad (5)$$

$$C_x = \frac{1}{1.1R} \quad (6)$$

To calibrate the circuit 1300, a pulse duration-to-capacitance table may be generated using known capacitance values. During active measurement, the processor acquires the pulse duration (t) and determines $C_x$ by applying the acquired pulse duration (t) to the formula (6) shown above.

Figure 14:
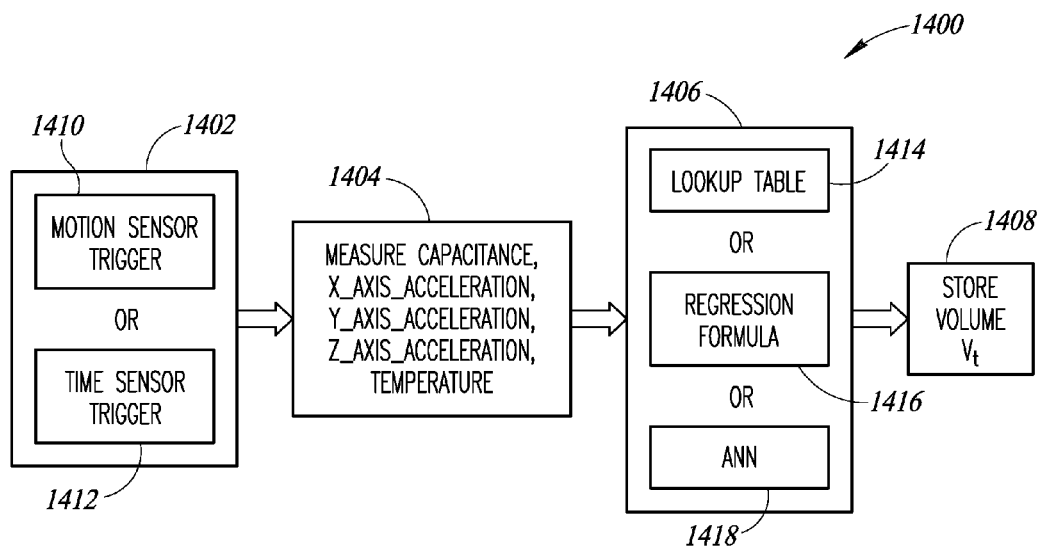
FIG. 14 is a schematic diagram of a method of determining the volume of liquid in a smart hydration container, according to one illustrated implementation.

FIG. 14 shows a method 1400 of operation for a smart hydration container (e.g., container 102 of FIG. 1) to measure a volume of liquid therein. The method 1400 includes a triggering act 1402, a measuring act 1404, a liquid volume determination act 1406, and a store volume act 1408.

In some implementations, the liquid volume calculations are triggered by specific events. For example, a motion sensor trigger 1410 may provide a trigger whenever the vector magnitude of an accelerometer of the smart hydration container is above a pre-determined threshold. As another example, a time sensor trigger 1412 may provide a trigger whenever a pre-determined amount of time has passed (e.g., several seconds, several minutes).

At 1404, once the liquid volume measurement has been triggered, the at least one processor of the smart hydration container may measure one or more parameters including, but not limited to, capacitance, temperature, x-axis acceleration, y-axis acceleration, and/or z-axis acceleration.

At 1406, after one or more of the aforementioned parameters have been detected or measured, the liquid volume may be determined using a lookup table 1414, a regression formula 1416, an artificial neural network (ANN) 1418, or other suitable algorithm.

A lookup table 1414 may use the capacitance, container position angles, and/or temperature obtained through a calibration process to determine the liquid volume present in the container. A regression formula 1416 may include performing calculation using a formula derived from a multivariable regression curve fit obtained during calibration of the container. An ANN model 1418 may take as inputs the capacitance, container position angles, and/or temperature, and the output is liquid volume.

In some implementations, liquid consumption may be measured by comparing the last stored liquid volume $V_{t-1}$ to the most recently determined liquid volume $V_t$ to determine whether the liquid volume has decreased, increased, or stayed the same (within a determined tolerance). The rate of change may also be computed to determine whether the volume change is within an expected (e.g., normal) rate. The rate of change, along with bottle position, allows the algorithm to discern scenarios where the liquid is being rapidly removed from the bottle (e.g., during emptying of the bottle) or rapidly added to the bottle (e.g., during filling of the bottle).

Prior to use, the container may be calibrated using any suitable calibration methods to obtain capacitance values for the capacitive sensor at known volumes, temperatures, and/or container orientations. Such methods include manual calibration, user trial-based calibration, semi-automated calibration, or fully automated calibration.

As discussed above, the capacitive sensor(s) surrounding a container allow a microcontroller to sense the volume of liquid in the container based on a capacitance reading which, depending on the method used, translates into an analog signal. This signal may be a voltage level, a waveform which frequency depends on liquid volume, etc. In some instances, due to the capacitive nature of the sensor, the sensor may be susceptible to changing electrical fields in the environment. In particular, the sensor may be sensitive to an approaching hand of a user as the electric field from the user's body causes the capacitance to change and thus erroneously changes the liquid volume perceived by the microcontroller. This undesirable effect may be referred to herein as "hand effect."

To reduce or minimize the hand effect, the capacitive sensor may be surrounded by or wrapped with a conductive sensor shield ("shield") which surface is electrically-isolated from the sensor surface. This feature is illustrated in FIG. 15, which shows the capacitive sensor 400 (also shown in FIGS. 4A and 4B) and a conductive shield 1500 that may be wrapped around the sensor 400 and electrically isolated therefrom by a suitable isolation layer (e.g., a layer of insulating material). FIG. 15 shows the conductive shield 1500 as an "unwrapped" planar sheet, although in practice the sheet may have a shape that is similar to the capacitive sensor 400 but slightly larger than the capacitive sensor to enable the conductive shield to surround the sensor to shield the sensor from a user's hands or other interference sources.

When positioned around the capacitive sensor 400 to surround the sensor, the conductive shield 150 forms essentially a cylindrically-shaped modified Faraday cage with a missing top and bottom that surrounds or encompasses the sensor 400. The capacitive sensor 400 may be formed of any suitable material, including a metal plate/foil or a conductive coating, for example. Similarly, the conductive shield 1500 may be formed of any suitable material, such as a metal plate/foil or a conductive coating, for example.

Figure 16:
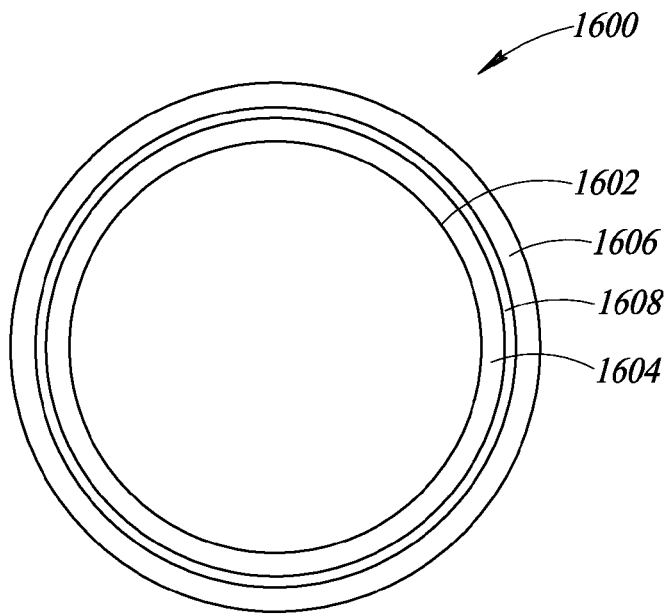
FIG. 16 is a top sectional view of conductive surfaces of a capacitive sensor surrounding a container, and a conductive sensor shield which surrounds the capacitive sensor and is isolated therefrom by an insulation layer, according to one illustrated implementation.

FIG. 16 shows a top sectional view of a container assembly 1600 that includes container 1602 that is surrounded by a conductive sensor 1604. The conductive sensor 1604 is in turn surrounded by a conductive shield 1606, which is electrically isolated from the conductive sensor 1604 by a suitable insulation layer 1608 (e.g., plastic). The conductive shield 1706 may be similar or identical to the conductive shield 1500 of FIG. 15. The conductive sensor 1604 may be similar or identical to any of the conductive sensors discussed herein. The capacitive sensor 1604 and the conductive shield 1606 may each be formed of any suitable material, including a metal plate/foil or a conductive coating, for example.

The conductive shield 1606 may be a passive shield, a grounded shield, or an active shield. In at least some implementations, the conductive shield 1606 is an active shield that is set to a charging voltage potential (Vcc), which is the supply voltage to which the capacitive sensor 1604 is charged. In at least some implementations, the conductive shield 1606 is an active shield that is set to a sensed voltage potential, which is the potential at which the capacitive sensor 1604 is sensed by the microcontroller.

In implementations that utilize a passive conductive shield 1606, the conductive shield may surround (e.g., wrap around) the conductive sensor 1604, and the conductive shield is electrically isolated from the conductive sensor and the microcontroller circuit (e.g., by one or more insulation layers). In other words, the conductive shield 1606 is not electrically coupled to anything. In theory, charges that build up on the conductive shield 1606 have nowhere to go.

Figure 17:
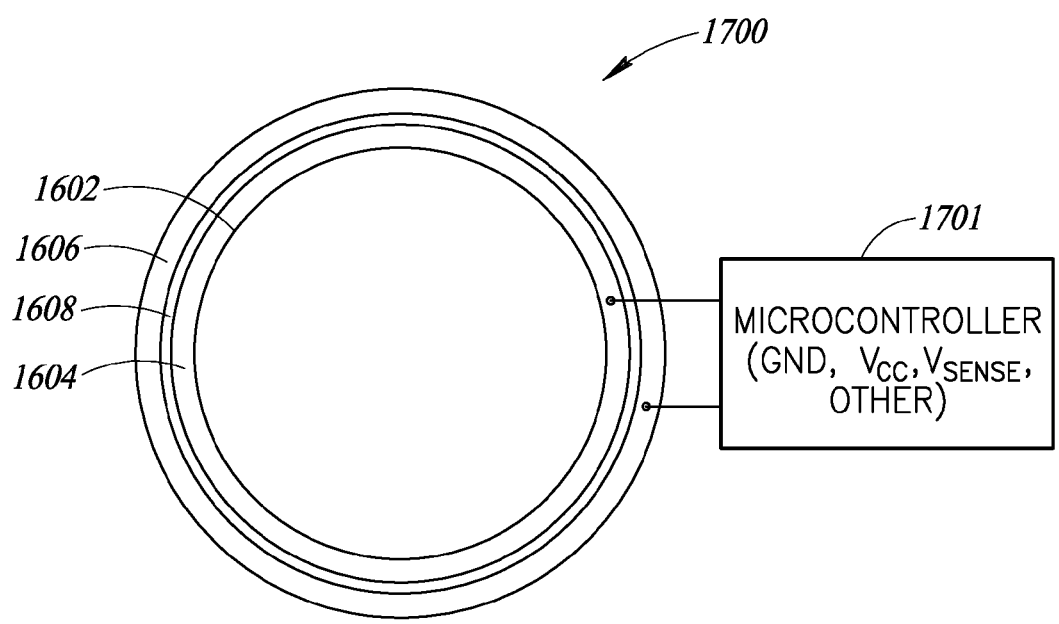
FIG. 17 is a top sectional view of conductive surfaces of a capacitive sensor surrounding a container, a conductive sensor shield which surrounds the capacitive sensor, and a microcontroller operatively coupled to the conductive sensor shield and the capacitive sensor, according to one illustrated implementation.

FIG. 17 shows a sectional view of a container assembly 1700 that includes the capacitive sensor 1604, the conductive shield 1606 and the insulation layer 1608 that electrically isolates the capacitive sensor and the conductive shield. In this example, each of the capacitive sensor 1604 and the conductive shield 1606 are electrically coupled to a microcontroller 1701. The capacitive sensor 1604 may be electrically coupled to an input node of the microcontroller 1701, which may be referred to as a sense node ($V_{SENSE}$).

In at least some implementations, the conductive shield 1606 may be electrically coupled to a ground node or pin (GND) of the microcontroller 1701 to provide a grounded conductive shield. In theory, this shielding configuration shunts any charge that build up from the external electrical field on the outside of the container 1602 to ground and reduces and/or eliminates any impact on the electric field of the conductive sensor 1602. Tests show this approach may be effective, but may also benefit from processing (e.g., software processing, hardware processing) to reduce jumps or spikes in capacitive measurement readings.

In at least some implementations, the conductive shield 1606 may be raised to the charging voltage $V_{CC}$ by coupling the conductive shield to a charging voltage pin ($V_{CC}$) of the microcontroller 1701 for the conductive sensor 1604. In theory, this approach forces a constant, non-changing field to form on the conductive shield 1606, thus reducing any variations of the electrical field around the conductive sensor 1604. Tests show that this shielding configuration has about the same effectiveness as the grounded shield configuration, discussed above. Once again, the small jumps in capacitance readings may be further reduced/processed out in software and/or hardware.

In at least some implementations, the conductive shield 1606 may be raised to the sensed voltage level by electrically coupling the conductive shield to the same sensor pin (e.g., $V_{SENSE}$) that the microcontroller 1701 uses to read the voltage of the capacitive sensor 1604. This approach forces the conductive shield 1606 to be at the same potential as the capacitive sensor 1604 connected to the microcontroller 1701. In this shielding configuration, since the conductive shield 1606 and the capacitive sensor 1604 are at the same potential, charges on the capacitive sensor are not influenced by the external electrical field. Tests show that this configuration may be the most effective of the shielding configurations discussed herein.

In at least some implementations, the conductive shield 1606 may be raised to a voltage potential different than ground, the charging voltage ($V_{CC}$) or the sensed voltage ($V_{SENSE}$). As a non-limiting example, the conductive shield 1606 may be raised to a voltage that is an average of the charging voltage ($V_{CC}$) and the sensed voltage ($V_{SENSE}$).

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

U.S. provisional patent application Ser. No. 62/306,846, filed Mar. 11, 2016, is hereby incorporated herein by reference in its entirety.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A container, comprising:
a container body which defines a volume for receiving a liquid;
a capacitive sensor comprising:
a first conductive surface helically wrapped at least one full turn around the container body; and
a second conductive surface helically wrapped at least one full turn around the container body, the second conductive surface adjacent the first conductive surface and separated therefrom by a first helically shaped gap and a second helically shaped gap;
at least one nontransitory processor-readable storage medium which stores at least one of processor-executable instructions or data; and
at least one processor communicatively coupled to the at least one nontransitory processor-readable storage medium and the capacitive sensor, in operation the at least one processor:
receives a capacitive sensor signal output from the capacitive sensor, the capacitive sensor signal indicative of a capacitance value between the first and second conductive surfaces;
autonomously determines a volume of liquid present in the container body based at least in part on the received capacitive sensor signal; and
stores the determined volume of liquid in the at least one nontransitory processor-readable storage medium.

2. The container of claim 1 wherein the first conductive surface and the second conductive surface comprise at least one of aluminum, copper, conductive paint, indium tin oxide coated plastic, or conductive filament.

3. The container of claim 1 wherein the first conductive surface and the second conductive surface are each helically wrapped at least two turns around the container body.

4. The container of claim 1 wherein the first conductive surface has a first surface area and the second conductive surface has a second surface area, the second surface area substantially equal to the first surface area.

5. The container of claim 1 wherein the first conductive surface has a first surface area and the second conductive surface has a second surface area, the second surface area different from the first surface area.

6. The container of claim 1 wherein the first conductive surface has a first surface area, the second conductive surface has a second surface area, and the container body has a third surface area, the first and second surface areas together comprise at least fifty percent of the third surface area.

7. The container of claim 1 wherein the first conductive surface has a first surface area, the second conductive surface has a second surface area, and the container body has a third surface area, the first and second surface areas together comprise at least ninety percent of the third surface area.

8. The container of claim 1 wherein the first helically shaped gap is disposed at a first helical angle and the second helically shaped gap is disposed at a second helical angle, the second helical angle different from the first helical angle.

9. The container of claim 1 wherein the first conductive surface has a first width and the second conductive surface has a second width, the second width substantially equal to the first width.

10. The container of claim 1 wherein the first conductive surface has a first conductive surface width, the second conductive surface has a second conductive surface width, the first helically shaped gap has a first gap width, the second helically shaped gap has a second gap width, and each of the first and second gap widths are less than either of the first and second conductive surface widths.

11. The container of claim 1 wherein the at least one processor:
implements at least one of a lookup table, a regression curve fit, or an artificial neural network model to autonomously determine a volume of liquid present in the container body based at least in part on the received capacitive sensor signal.

12. The container of claim 1, further comprising:
a temperature sensor which in operation outputs a temperature sensor signal indicative of a temperature of the liquid in the container body,
wherein the at least one processor is communicatively coupled to the temperature sensor, and in operation the at least one processor:
receives the temperature sensor signal from the temperature sensor;
autonomously determines a volume of liquid present in the container body based at least in part on the received capacitive sensor signal and temperature sensor signal; and
stores the determined volume of liquid in the at least one nontransitory processor-readable storage medium.

13. The container of claim 12 wherein the at least one processor:
implements at least one of a lookup table, a regression curve fit, or an artificial neural network model to autonomously determine a volume of liquid present in the container body based at least in part on the received capacitive sensor signal and temperature sensor signal.

14. The container of claim 1, further comprising:
at least one user notification indicator which in operation generates a user-perceptible signal,
wherein the at least one processor is communicatively coupled to the at least one user notification indicator, and in operation the at least one processor:
autonomously causes the at least one user notification indicator to generate the user-perceptible signal based at least in part on the determined volume of liquid stored in the at least one nontransitory processor-readable storage medium.

15. The container of claim 14 wherein the at least one user notification indicator comprises at least one of a light, a speaker, a buzzer, or a vibrator.

16. The container of claim 14 wherein the at least one user notification indicator comprises at least one user notification indicator of a separate computing device communicatively coupled with the at least one processor of the container.

17. The container of claim 1 wherein the at least one processor:
receives a trigger signal; and
autonomously determines a volume of liquid present in the container body responsive to the received trigger signal.

18. The container of claim 17 wherein the trigger signal is generated based at least in part on an elapsed amount of time.

19. The container of claim 17 wherein the trigger signal is generated based at least in part on a detection of a movement of the container body.

20. The container of claim 19 wherein the trigger signal is generated based at least in part on a detection of at least one of: the container being picked up by a user or the container being shaken by a user.

21. The container of claim 1, further comprising:
a conductive sensor shield which surrounds at least a portion of the capacitive sensor and is electrically isolated from the capacitive sensor.

22. The container of claim 21 wherein the conductive sensor shield is formed from one of a metal plate, a sheet of metal foil, or a conductive coating.

23. The container of claim 21 wherein the conductive sensor shield is electrically coupled to the capacitive sensor signal output of the capacitive sensor.

24. The container of claim 21 wherein the conductive sensor shield is electrically coupled to one of a ground voltage potential or a voltage potential to which the capacitive sensor is charged.

25. A container, comprising:
a container body which defines a volume for receiving a liquid;
a capacitive sensor comprising:
a first conductive surface helically wrapped at least one full turn around the container body; and
a second conductive surface helically wrapped at least one full turn around the container body, the second conductive surface adjacent the first conductive surface and separated therefrom by a first helically shaped gap and a second helically shaped gap;
a temperature sensor;
at least one nontransitory processor-readable storage medium which stores at least one of processor-executable instructions or data; and
at least one processor communicatively coupled to the at least one nontransitory processor-readable storage medium, the capacitive sensor, and the temperature sensor, in operation the at least one processor:
receives a capacitive sensor signal output from the capacitive sensor, the capacitive sensor signal indicative of a capacitance value of the capacitive sensor which varies based at least in part with the volume of liquid present in the container body;
receives a temperature sensor signal from the temperature sensor, the temperature sensor signal indicative of a temperature of the liquid in the container body;
autonomously determines a volume of liquid present in the container body based at least in part on the received capacitive sensor signal and temperature sensor signal; and
stores the determined volume of liquid in the at least one nontransitory processor-readable storage medium.

26. The container of claim 25, further comprising:
at least one user notification indicator which in operation generates a user-perceptible signal,
wherein the at least one processor is communicatively coupled to the at least one user notification indicator, and in operation the at least one processor:
autonomously causes the at least one user notification indicator to generate the user-perceptible signal based at least in part on the determined volume of liquid stored in the at least one nontransitory processor-readable storage medium.

27. The container of claim 26 wherein the at least one user notification indicator comprises at least one user notification indicator of a separate computing device communicatively coupled with the at least one processor of the container.

28. The container of claim 25 wherein the capacitive sensor comprises:
a first set of conductive surfaces wrapped around at least a portion of the container body; and
a second set of conductive surfaces wrapped around at least a portion of the container body, the second set of conductive surfaces disposed radially outward of the first set of conductive surfaces.

29. A container, comprising:
a container body which defines a volume for receiving a liquid;
a capacitive sensor;
an orientation sensor which in operation outputs an orientation sensor signal indicative of an orientation of the container body;
at least one nontransitory processor-readable storage medium which stores at least one of processor-executable instructions or data; and
at least one processor communicatively coupled to the at least one nontransitory processor-readable storage medium, the capacitive sensor, and the orientation sensor, in operation the at least one processor:
receives a capacitive sensor signal output from the capacitive sensor, the capacitive sensor signal indicative of a capacitance value of the capacitive sensor;
receives the orientation sensor signal from the orientation sensor;
autonomously determines a volume of liquid present in the container body based at least in part on the received capacitive sensor signal and orientation sensor signal; and
stores the determined volume of liquid in the at least one nontransitory processor-readable storage medium.

30. A method, comprising:
providing a container comprising:
a container body which defines a volume for receiving a liquid;
a capacitive sensor comprising:
a first conductive surface helically wrapped at least one full turn around the container body; and
a second conductive surface helically wrapped at least one full turn around the container body, the second conductive surface adjacent the first conductive surface and separated therefrom by a first helically shaped gap and a second helically shaped gap;
at least one nontransitory processor-readable storage medium which stores at least one of processor-executable instructions or data; and
at least one processor communicatively coupled to the at least one nontransitory processor-readable storage medium and the capacitive sensor;

receiving, by the at least one processor, a capacitive sensor signal output from the capacitive sensor, the capacitive sensor signal indicative of a capacitance value between the first and second conductive surfaces;

autonomously determining, by the at least one processor, a volume of liquid present in the container body based at least in part on the received capacitive sensor signal; and storing, by the at least one processor, the determined volume of liquid in the at least one nontransitory processor-readable storage medium.

\* \* \* \* \*